(12) United States Patent
Park et al.

(10) Patent No.: US 8,235,540 B2
(45) Date of Patent: Aug. 7, 2012

(54) BACKLIGHT UNIT AND DISPLAY APPARATUS USING THE SAME

(75) Inventors: Sung Yong Park, Seoul (KR); Se Jin Ko, Seoul (KR); Sung Ho Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/109,071

(22) Filed: May 17, 2011

(65) Prior Publication Data

US 2011/0222267 A1     Sep. 15, 2011

(51) Int. Cl.
G09F 13/14     (2006.01)

(52) U.S. Cl. .......... 362/97.1; 362/217.01; 362/235; 362/97.3; 362/241

(58) Field of Classification Search .......... 362/600, 362/603, 609, 97.1–97.3, 612, 613, 632, 362/633
See application file for complete search history.

(56) References Cited

U.S. PATENT DOCUMENTS

| | | | | |
|---|---|---|---|---|
| 5,136,483 A | * | 8/1992 | Schoniger et al. | 362/545 |
| 6,234,646 B1 | * | 5/2001 | Ito | 362/235 |
| 6,238,073 B1 | * | 5/2001 | Ito et al. | 362/544 |
| 6,332,701 B1 | * | 12/2001 | Yamada et al. | 362/517 |
| 7,255,459 B2 | * | 8/2007 | Kuan et al. | 362/247 |
| 7,976,209 B2 | * | 7/2011 | Iwasaki et al. | 362/628 |
| 2003/0067759 A1 | | 4/2003 | Blanchard | |
| 2009/0103327 A1 | | 4/2009 | Iwasaki et al. | |
| 2009/0303744 A1 | | 12/2009 | Iwasaki | |
| 2010/0020568 A1 | * | 1/2010 | Iwasaki et al. | 362/612 |
| 2010/0080019 A1 | | 4/2010 | Iwasaki | |

FOREIGN PATENT DOCUMENTS

| | | |
|---|---|---|
| EP | 0201926 | 5/1986 |
| FR | 2642209 | 7/1990 |
| JP | 2000-011724 | 1/2000 |
| JP | 2002-008425 | 1/2002 |
| JP | 2004-186004 | 7/2004 |
| JP | 2004-288498 | 10/2004 |
| JP | 2005-108776 | 4/2005 |
| JP | 2005-129409 | 5/2005 |
| JP | 2006106212 | 4/2006 |
| JP | 2006147398 | 6/2006 |
| JP | 2011-523177 | 8/2011 |
| KR | 1020010026307 | 4/2001 |
| KR | 1020060078576 | 7/2006 |
| KR | 1020060078676 | 7/2006 |
| KR | 100879772 | 1/2009 |
| KR | 100960662 | 5/2010 |
| KR | 1020100076821 | 7/2010 |
| KR | 1020100135990 | 12/2010 |
| KR | 10/1107694 | 1/2012 |

OTHER PUBLICATIONS

European Search Report for 11169457 dated Nov. 9, 2011.
Korean Office Action for 10-2011-0004272 dated Apr. 19, 2012, citing the above reference(s).
Korean Office Action for 10-2011-0004270 dated Apr. 19, 2012, citing the above reference(s).
Korean Office Action for 10-2011-0004271 dated Apr. 19, 2012, citing the above reference(s).

* cited by examiner

*Primary Examiner* — Anabel Ton
(74) *Attorney, Agent, or Firm* — Lowe Hauptman Ham & Berner, LLP

(57) ABSTRACT

A backlight unit and a display apparatus using the same are disclosed. The backlight unit includes a first reflector, a second reflector, and at least one light source disposed between the first reflector and the second reflector. The second reflector include at least two inclined surface adjacent to each other about at least one inflection point, the first and second inclined surfaces having different radii of curvature.

19 Claims, 30 Drawing Sheets

BACKLIGHT UNIT AND DISPLAY APPARATUS USING THE SAME

This application claims the benefit of Korean Patent Application No. 10-2011-0004270, filed on, Jan. 14, 2011, Patent Application No. 10-2011-0004271, filed on Jan. 14, 2011, Patent Application No. 10-2011-0004272, filed on Jan. 14, 2011, and Patent Application No. 10-2011-0042562, filed on May 4, 2011, which are hereby incorporated by reference as if fully set forth herein.

BACKGROUND OF THE INVENTION

1. Field of the Invention

Embodiments relate to a backlight unit and a display apparatus using the same.

2. Discussion of the Related Art

Generally, representative large-scale display apparatuses include Liquid Crystal Displays (LCDs), Plasma display Panels (PDPs), etc.

Unlike self-emission type PDPs, LCDs essentially need a separate backlight unit due to absence of self light emitting devices.

Backlight units for use in LCDs are classified into edge type backlight units and vertical type backlight units according to positions of light sources. In an edge type backlight unit, light sources are arranged at left and right edges or upper and lower edges of an LCD panel and a light guide plate is provided to uniformly distribute light throughout a surface of the LCD panel, which ensures uniform luminance and enables production of an extremely thin display panel.

A vertical type backlight unit is generally applied to displays of 20 inches or more. The vertical type backlight unit advantageously has greater light efficiency than the edge type backlight unit owing to a plurality of light sources being arranged below a panel and thus, is mainly used in a large-scale display requiring high luminance.

Conventional edge type or vertical type backlight units adopt Cold Cathode Fluorescent Lamps (CCFL) as a light source.

The backlight units using CCFLs, however, have several disadvantages, such as consumption of a great quantity of power because power should always be applied to a CCFL, low color reproduction efficiency of about 70% that of a Cathode Ray Tube (CRT), and environmental pollution due to use of mercury.

Currently, backlight units using Light Emitting Diodes (LEDs) are being studied as a solution to the above described problems.

In the case of backlight units using LEDs, turning on or off a part of an LED array is possible, which can achieve remarkable reduction in power consumption. In particular, RGB LEDs exhibit color reproduction beyond 100% of a color reproduction range proposed by the National Television System Committee (NTSC) and can provide more vivid images to consumers.

Further, LEDs fabricated through semiconductor processes are environmentally friendly.

Although LCD products using LEDs having the above described advantages have been introduced, these LCD products need expensive drivers, PCBs, etc. because LEDs have a driving mechanism different from conventional CCFLs.

For this reason, LED backlight units are applied only to high-price LCD products at present.

SUMMARY OF THE INVENTION

An object of the present invention is to provide a backlight unit, which includes an air guide to realize a light-weight design suited to mass-production using a reflector having inclined surfaces of different radii of curvature, and a display apparatus using the backlight unit.

To achieve these objects and other advantages and in accordance with the purpose of the invention, as embodied and broadly described herein, a backlight unit includes a first reflector, a second reflector, and at least one light source disposed between the first reflector and the second reflector, wherein the second reflector includes at least two inclined surfaces having at least one inflection point, and radii of curvature of the first and second inclined surfaces adjacent to each other about the inflection point are different from each other.

In accordance with another aspect of the present invention, a backlight unit includes a first reflector, a second reflector, at least one light source disposed between the first reflector and the second reflector, and a cover plate to support the light source and come into contact with the first reflector and the second reflector, wherein the cover plate includes a first segment having a first surface to which the first reflector is attached and a second surface opposite to the first surface, the second surface being provided with a plurality of first protrusions, a second segment extending from the first segment and having a second protrusion adjacent to the light source and a coupling recess formed at an opposite side of the second protrusion, and a third segment extending from the second segment and fixed to one side of the second reflector, the third segment having a third protrusion.

In accordance with a further aspect of the present invention, a display apparatus includes a display panel, and a backlight unit to project light to the display panel, wherein the backlight unit includes a first reflector, a second reflector, and at least one light source disposed between the first reflector and the second reflector, wherein the second reflector includes at least two inclined surfaces having at least one inflection point, and radii of curvature of the first and second inclined surfaces adjacent to each other about the inflection point are different from each other.

BRIEF DESCRIPTION OF THE DRAWINGS

Arrangements and embodiments may be described in detail with reference to the following drawings in which like reference numerals refer to like elements and wherein.

DETAILED DESCRIPTION OF THE INVENTION

Reference will now be made in detail to the preferred embodiments of the present invention, examples of which are illustrated in the accompanying drawings.

Prior to description of the embodiments, it will be understood that, when each element is referred to as being formed "on" or "under" the other element, it can be directly "on" or "under" the other element or be indirectly formed with intervening one or more other elements therebetween.

The terms "on" or "under" may indicate either a downward direction or an upward direction when reinforcing a single element.

Figure 1A:
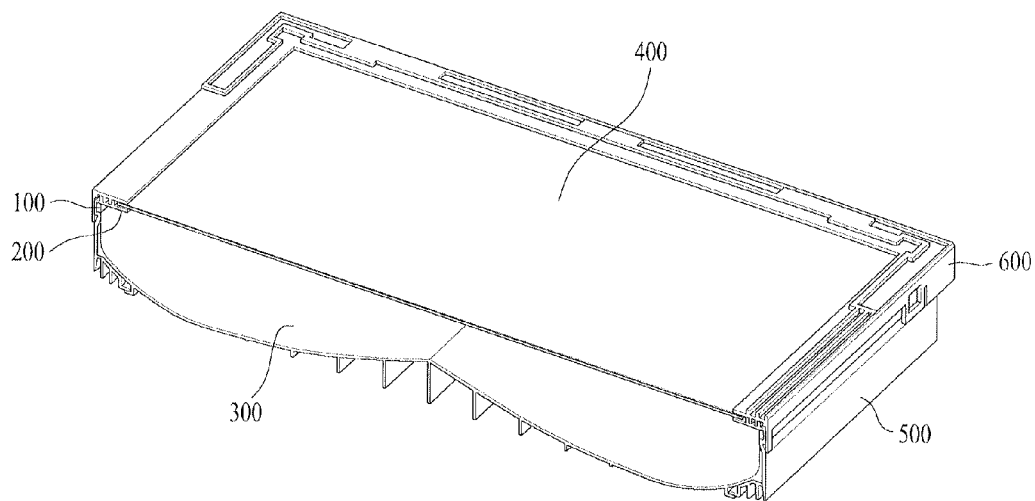
FIGS. 1A to 1D are views explaining a 2-edge type backlight unit according to an embodiment.
Figure 1B:
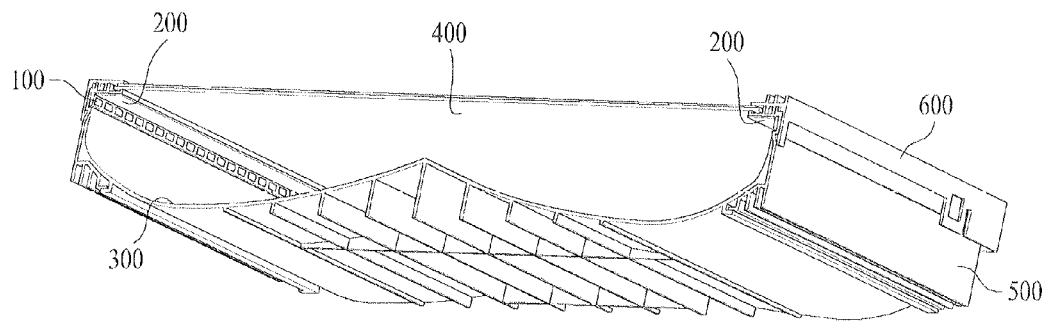
Figure 1C:
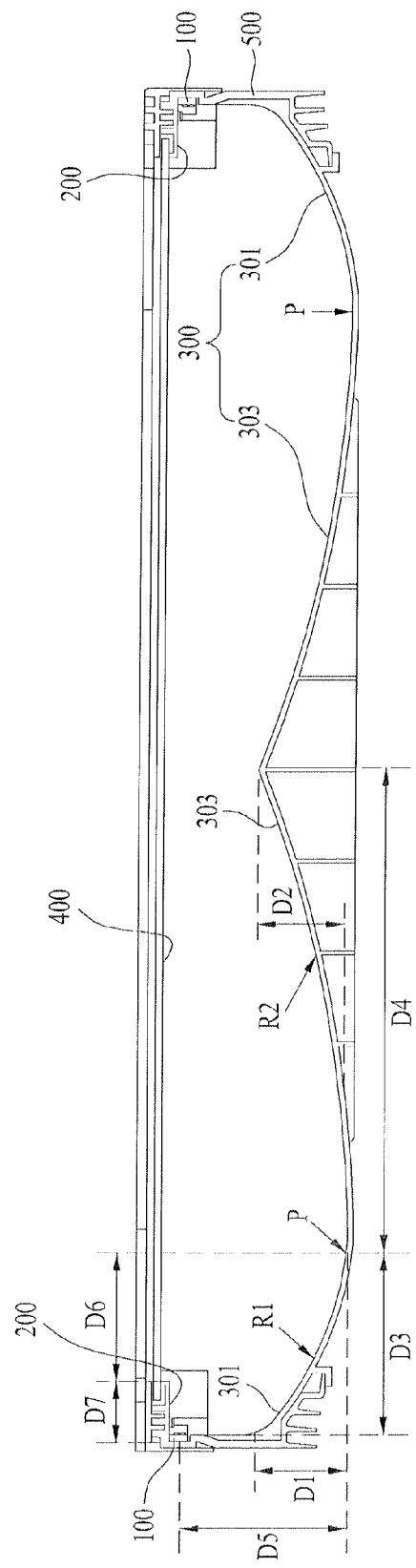

FIGS. 1A to 1D are views explaining a 2-edge type backlight unit according to an embodiment. FIG. 1A is a top perspective view, FIG. 1B is a bottom perspective view and FIG. 1C is a sectional view.

As illustrated in FIGS. 1A to 1D, the backlight unit may include a light source module 100 including at least one light source, a first reflector 200 and a second reflector 300.

The light source module 100 may be located between the first reflector 200 and the second reflector 300 and may be disposed close to the first reflector 200 or the second reflector 300.

As occasion demands, the light source module 100 may come into contact with the first reflector 200 while being spaced apart from the second reflector 300 by a predetermined distance, or may come into contact with the second reflector 300 while being spaced apart from the first reflector 200 by a predetermined distance.

Alternatively, the light source module 100 may be spaced apart from both the first reflector 200 and the second reflector 300 by a predetermined distance, or may come into contact with both the first reflector 200 and the second reflector 300.

The light source module 100 may include a circuit board having an electrode pattern and light emitting devices to generate light.

In this case, at least one light emitting device may be mounted on the circuit board and the electrode pattern formed on the circuit board may connect the light emitting device to a power supply adaptor.

For example, a carbon nanotube electrode pattern may be formed on an upper surface of the circuit board so as to connect the light emitting device and the adaptor to each other.

The circuit board may be a Printed Circuit Board (PCB) made of polyethylene terephthalate (PET), glass, polycarbonate (PC), silicon (Si), or the like, on which a plurality of light emitting devices is mounted, or may take the form of a film.

The circuit board may be selected from among a single-layer PCB, a multi-layer PCB, a ceramic board, a metal core PCB, and the like.

The light emitting device may be a Light Emitting Diode (LED) chip. The LED chip may be a blue LED chip or ultraviolet LED chip, or may be a package combining at least one or more selected from among a red LED chip, green LED chip, blue LED chip, yellow green LED chip and white LED chip.

A white LED may be realized by coupling a yellow phosphor to a blue LED, coupling both red and green phosphors to a blue LED, or coupling yellow, red and green phosphors to a blue LED.

The first reflector 200 and the second reflector 300 may be spaced apart from each other by a predetermined distance so as to face each other such that an air guide is defined in a gap between the first reflector 200 and the second reflector 300.

Here, the first reflector 200 may have an open region and may come into contact with or be spaced apart from one side of the light source module 100 by a predetermined distance.

Specifically, the first reflector 200 may have a central open region, and the light source module 100 may include a first light source module and a second light source module arranged at opposite edge regions of the first reflector 200 so as to face each other.

The first reflector 200 may be made of any one of a reflective coating film and a reflective coating material layer and may serve to reflect the light emitted from the light source module 100 toward the second reflector 300.

A saw-toothed reflective pattern may be formed on a surface of the first reflector 200 facing the light source module 100. The reflective pattern may have a flat surface or a curved surface.

The surface of the first reflector 200 is provided with the reflective pattern so as to reflect the light emitted from the light source module 100 toward a central region of the second reflector 300, thereby increasing luminance of a central region of the backlight unit.

The second reflector 300 may be spaced apart from the light source module 100 by a predetermined distance and may have an inclined surface having a predetermined inclination angle with respect to a horizontal plane parallel to the surface of the first reflector 200.

The inclined surface of the second reflector 300 may serve to reflect the light emitted from the light source module 100 or reflected from the first reflector 200 toward the open region of the first reflector 200.

The second reflector 300 may include at least two inclined surfaces having at least one inflection point.

Figure 2A:
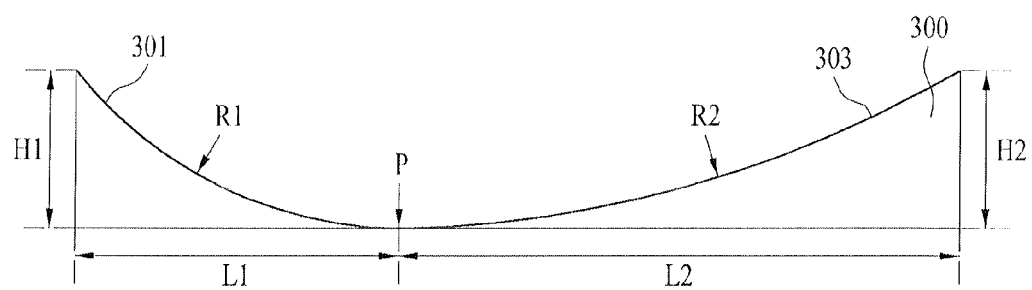
FIGS. 2A and 2B are views respectively illustrating a difference between radii of curvature of a first inclined surface and a second inclined surface of a second reflector.
Figure 2B:
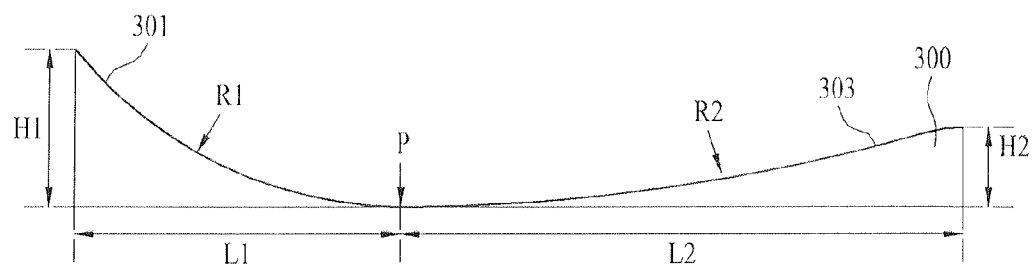

FIGS. 2A and 2B are views respectively illustrating a difference between radii of curvature of a first inclined surface and a second inclined surface of the second reflector.

As illustrated in FIGS. 2A and 2B, the first and second inclined surfaces 301 and 303 adjacent to each other about an inflection point P may have different radii of curvature R1 and R2.

The inflection point P between the first and second inclined surfaces 301 and 303 may be located at a region of the second reflector 300 close to the light source module 100, but may be located at a region distant from the light source module 100.

If the radius of curvature R1 of the first inclined surface 310 close to the light source module 100 is less than the radius of curvature R2 of the second inclined surface 303, the inflection point P is located at a region of the second reflector 300 close to the light source module 100. On the other hand, if the radius of curvature R1 of the first inclined surface 310 close to the light source module 100 is greater than the radius of curvature R2 of the second inclined surface 303, the inflection point P is located at a region of the second reflector 300 distant from the light source module 100.

In the embodiment of FIG. 2A, the radius of curvature R1 of the first inclined surface 301 may be less than the radius of curvature R2 of the second inclined surface 303, a maximum height H1 of the first inclined surface 301 may be equal to a maximum height H2 of the second inclined surface 303, and a distance L1 between the inflection point P and a distal end of the first inclined surface 301 may be less than a distance L2 between the inflection point P and a distal end of the second inclined surface 303.

In the embodiment of FIG. 2B, the radius of curvature R1 of the first inclined surface 301 may be less than the radius of curvature R2 of the second inclined surface 303, the maximum height H1 of the first inclined surface 301 may be greater than the maximum height H2 of the second inclined surface 303, and the distance L1 between the inflection point P and the distal end of the first inclined surface 301 may be less than the distance L2 between the inflection point P and a distal end of the second inclined surface 303.

A positional relationship between the light source module 100 and the first and second reflectors 200 and 300 will now be described in more detail.

Figure 1D:
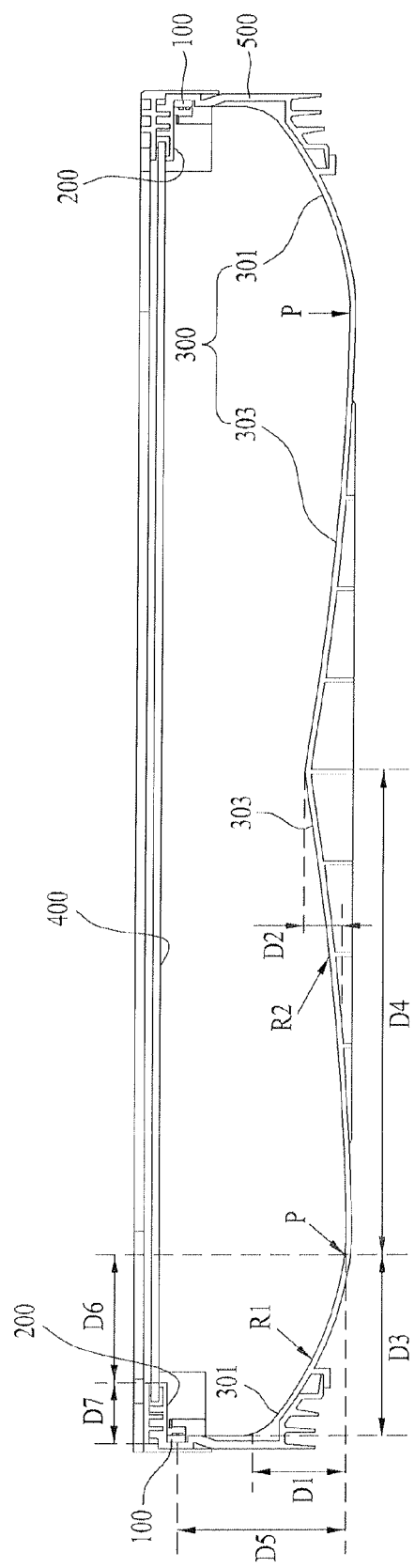

As illustrated in FIGS. 1C and 1D, the first inclined surface 301 may be located close to the light source module 100 and the radius of curvature R1 of the first inclined surface 301 may be greater or less than the radius of curvature R2 of the second inclined surface 303.

As occasion demands, the radius of curvature R1 of the first inclined surface 301 may be equal to the radius of curvature R2 of the second inclined surface 303.

Here, a ratio of the radius of curvature R1 of the first inclined surface 301 to the radius of curvature R2 of the second inclined surface 303 may be in a range of 1:0.1 to 1:10.

A distance D1 between a first horizontal line extending from the inflection point P and a second horizontal line extending from a distal end point of the first inclined surface 301 may be equal to a distance D2 between the first horizontal line extending from the inflection point P and a third horizontal line extending from a distal end point of the second inclined surface 303.

As occasion demands, the first distance D1 between the first horizontal line extending from the inflection point P and the second horizontal line extending from the distal end point of the first inclined surface 301 may be greater or less than the second distance D2 between the first horizontal line extending from the inflection point P and the third horizontal line extending from the distal end point of the second inclined surface 303.

Here, a ratio of the first distance D1 to the second distance D2 may be in a range of 1:0.01 to 1:5.

Also, a third distance D3 between a first vertical line extending from the inflection point P and a second vertical line extending from the distal end point of the first inclined surface 301 may be greater or less than a fourth distance D4 between the first vertical line extending from the inflection point P and a third vertical line extending from the distal end point of the second inclined surface 303.

As occasion demands, the third distance D3 between the first vertical line extending from the inflection point P and the second vertical line extending from the distal end point of the first inclined surface 301 may be equal to the fourth distance D4 between the first vertical line extending from the inflection point P and the third vertical line extending from the distal end point of the second inclined surface 303.

Here, a ratio of the third distance D3 to the fourth distance D4 may be in a range of 1:0.05 to 1:20.

Also, a fifth distance D5 between the first horizontal line extending from the inflection point P and a fourth horizontal line extending from a point of the light source module 100 may be equal to the second distance D2 between the first horizontal line extending from the inflection point P and the third horizontal line extending from the distal end point of the second inclined surface 303.

However, as occasion demands, the fifth distance D5 between the first horizontal line extending from the inflection point P and the fourth horizontal line extending from the point of the light source module 100 may be greater than the second distance D2 between the first horizontal line extending from the inflection point P and the third horizontal line extending from the distal end point of the second inclined surface 303.

The first reflector 200 includes a first distal end close to the light source module 100 and a second distal end facing the first distal end. A distance D7 between the first distal end and the second distal end may be about 3-30 mm.

A sixth distance D6 between the first vertical line extending from the inflection point P and a fourth vertical line extending from the second distal end of the first reflector 200 may be greater than the distance D7 between the first distal end and the second distal end of the first reflector 200.

As illustrated in FIG. 1D, the second inclined surface 303 of the second reflector 300 has a symmetrical shape about the central region of the second reflector 300. The central region of the second reflector 300 may have a convexly curved shape.

As occasion demands, the central region of the second reflector 300 may have a planar shape or a concavely curved shape.

That is, the central region of the second reflector 300 may have any one of a planar shape, convexly curved shape and concavely curved shape and combinations thereof.

The light source module 100 may come into contact with at least one of the first reflector 200 and the second reflector 300.

However, as occasion demands, the light source module 100 may be spaced apart from the first reflector 200 by a first distance and may be spaced apart from the second reflector 300 by a second distance.

Here, the second distance may be greater or less than the first distance.

This serves to allow the light emitted from the light source module 100 to be concentrated on the central region of the second reflector 300, increasing luminance at the central region of the backlight unit.

An optical member 400 may be supported on the first reflector 200 and be disposed to face the second reflector 200.

The optical member 400 may include at least one sheet selected from among a diffusion sheet, prism sheet, luminance increasing sheet, and the like.

The diffusion sheet serves to diffuse light emitted from a light source, the prism sheet serves to guide the diffused light to a light emission area, and the luminance increasing sheet serves to increase luminance.

At least one of upper and lower surfaces of the optical member 400 may be provided with a roughened pattern for uniformly diffusing light.

A cover plate 500 may be provided to come into contact with the first reflector 200 and the second reflector 300 so as to fix both the reflectors to each other.

Also, a panel support member 600 may be fixed to the cover plate 500 so as to cover a part of the cover plate 500.

Figure 3A:
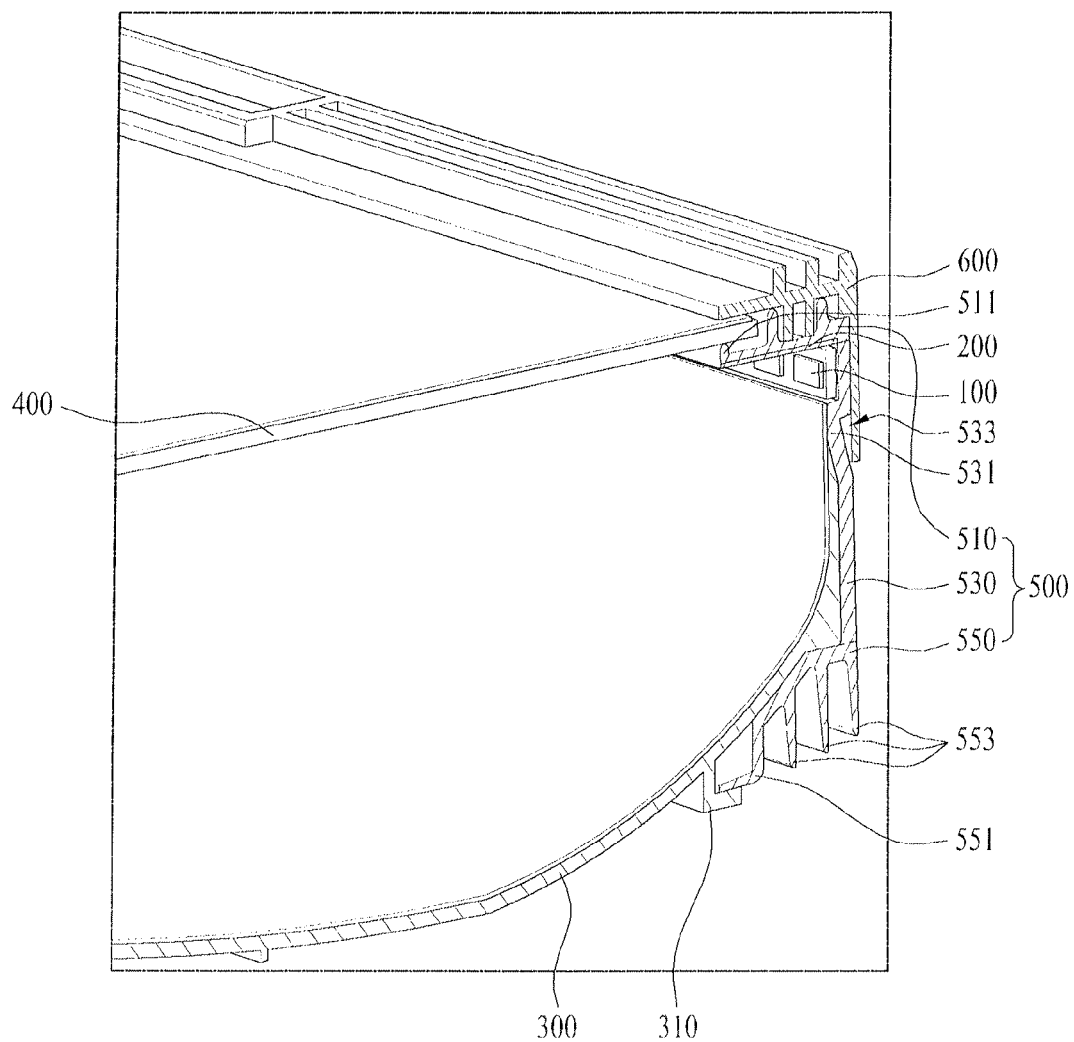
FIGS. 3A and 3B are views illustrating a cover plate and a panel support member in detail.
Figure 3B:
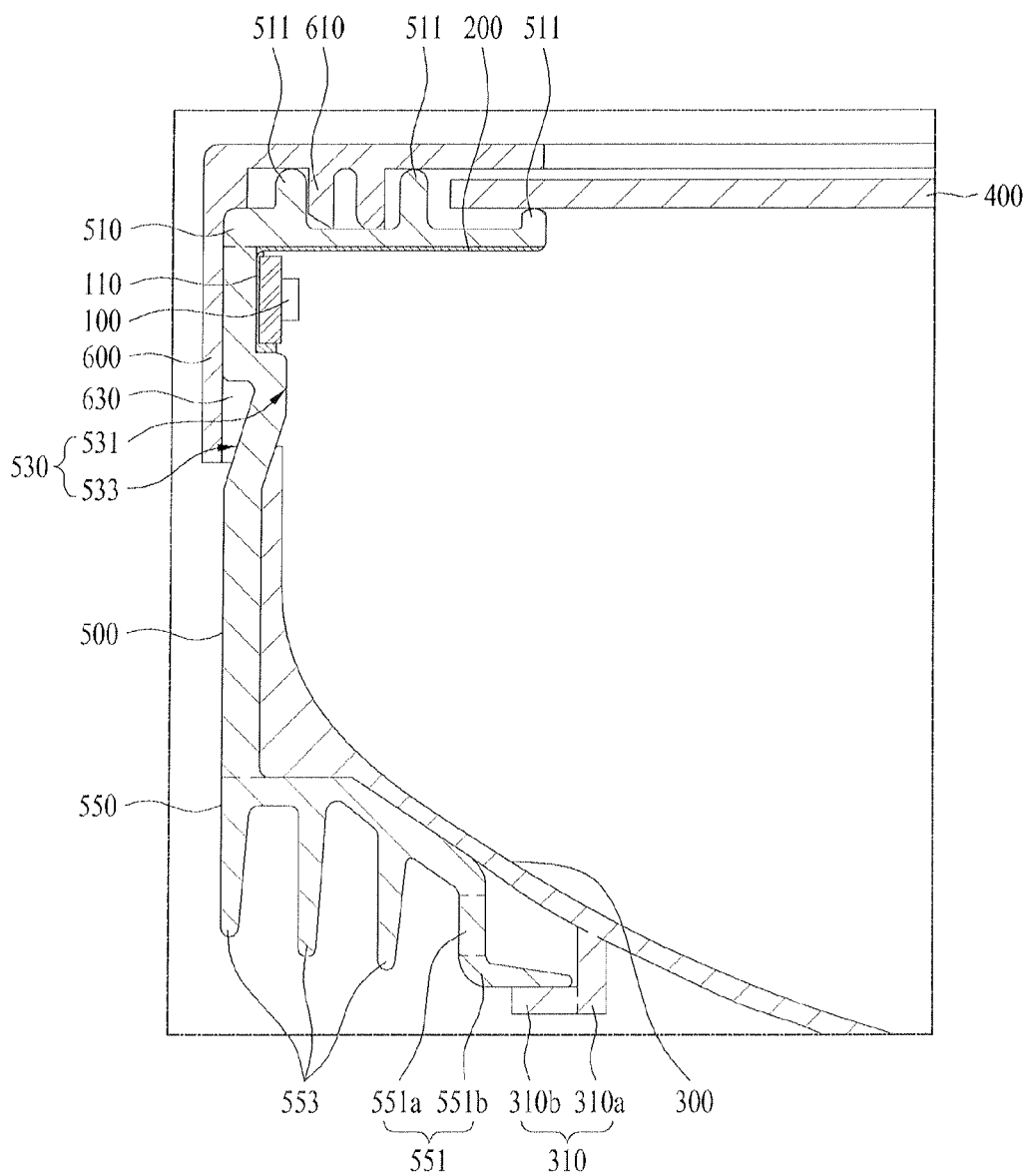

FIGS. 3A and 3B are views illustrating the cover plate and the panel support member in detail.

As illustrated in FIGS. 3A and 3B, the cover plate 500 may include first, second and third segments 510, 530 and 550.

The first segment 510 may include a first surface to which the first reflector 200 is attached, and an opposite second surface provided with a plurality of first protrusions 511.

The second segment 530 extends from the first segment 510 and may include a second protrusion 531 adjacent to the light source module 100 and a coupling recess 533 at an opposite side of the second protrusion 531.

The third segment 550 extends from the second segment 530 and is fixed to one side of the second reflector 300. The third segment 550 may include a third protrusion 551.

The optical member 400 may be supported by any one of the first protrusions 511 of the first segment 510 so as to be disposed to face the second reflector 300.

The panel support member 600 may be fixed to the cover plate 500 so as to cover a part of the cover plate 500.

The panel support member 600 includes at least one fourth protrusion 610 and at least one fifth protrusion 630. The fourth protrusion 610 may be inserted between the first protrusions 511 of the first segment 510, and the fifth protrusion 630 may be inserted into the coupling recess 533 of the second segment 530.

Here, the at least one fourth protrusion 610 inserted between the first protrusions 511 of the first segment 510 may include a plurality of fourth protrusions 610.

The number of the first protrusions 511 of the first segment 510 may be two or more.

Figure 4:
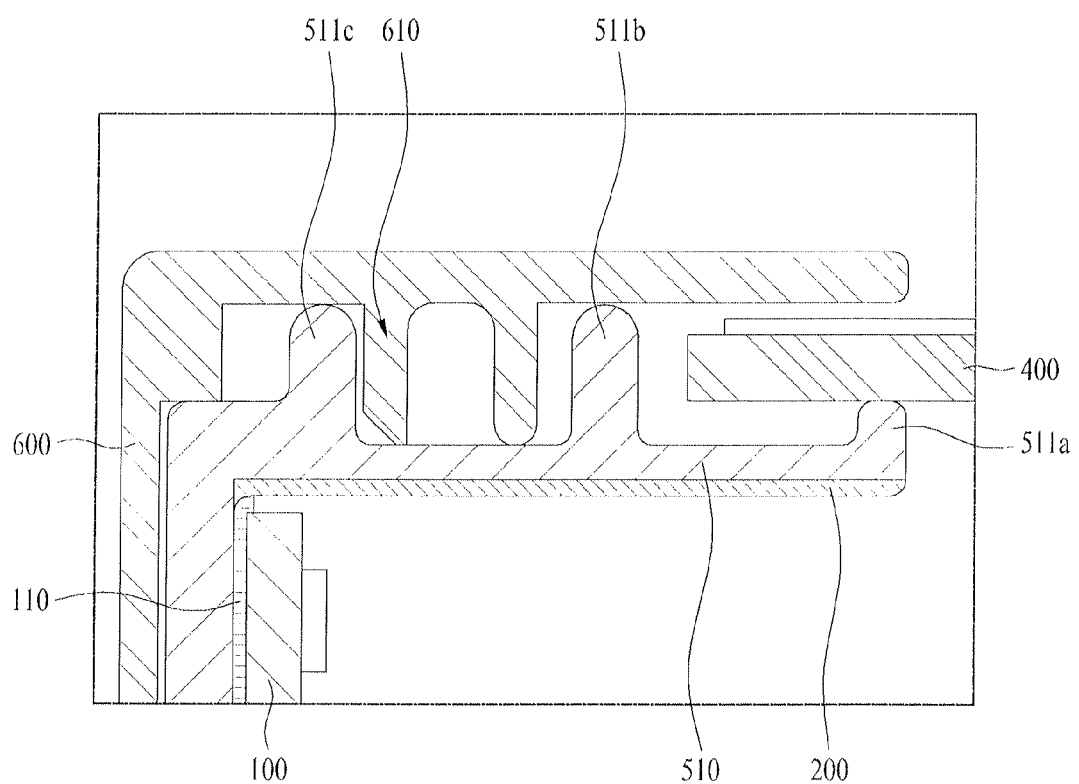
FIG. 4 is a view illustrating a first segment of FIG. 3B in detail.

FIG. 4 is a view illustrating the first segment of FIG. 3B in detail.

As illustrated in FIG. 4, the first segment 510 may include a first protruding line 511a and a second protruding line 511b.

At least one first protruding line 511a may be provided at an edge region of the first segment 510.

At least two second protruding lines 511b may be spaced apart from the first protruding line 511a.

The height of the first protruding line 511a may be less than the height of the second protruding lines 511b.

This is because the first protruding line 511a serves to support the optical member 400 and the adjacent second protruding line 511b serves to stably fix the optical member 400.

The first protrusions 511 of the first segment 510 may have a flat or curved upper surface.

FIGS. 5A to 5D are views illustrating the upper surface of the first protrusion of FIG. 4.

Figure 5A:
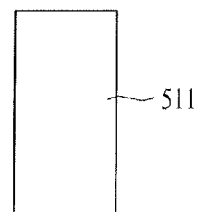
FIGS. 5A to 5D are views illustrating an upper surface of a first protrusion of FIG. 4.
Figure 5B:
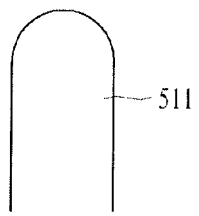

The first protrusion 511 may have a flat upper surface as illustrated in FIG. 5A, or may have a curved upper surface as illustrated in FIG. 5B.

To reduce a contact area between the optical member 400 and the first protrusion 511 used to support the optical member 400, the first protrusion 511 may have a curved upper surface.

Figure 5C:
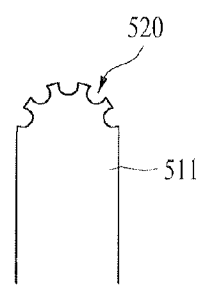

As occasion demands, to further reduce the contact area between the first protrusion 511 and the optical member 400, as illustrated in FIG. 5C, the upper surface of the first protrusion 511 may be provided with shock-absorbing recesses 520.

Figure 5D:
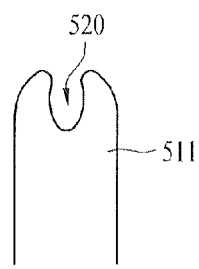

Although the plurality of shock-absorbing recesses 520 may be formed in the upper surface of the first protrusion 511 as illustrated in FIG. 5C, only one shock-absorbing recess may be formed as illustrated in FIG. 5D.

The second segment 530 of the cover plate 500 includes the second protrusion 531, which is disposed at the periphery of the light source module 100 to support or fix the light source module 100.

A thermal pad 110 may be disposed between the second segment 530 and the light source module 100 and/or between the second protrusion 531 and the light source module 100.

The thermal pad 110 may assist the second segment 530 in supporting the light source module 100 and transmit heat generated from the light source module 100 to the second segment 530.

The third segment 550 of the cover plate 500 may include the third protrusion 551.

The third protrusion 551 may include a protruding portion 551a and a connecting portion 551b and be fixed to a fixture 310 of the second reflector 300.

The protruding portion 551a of the third protrusion 551 protrudes in a first direction, and the connecting portion 551b is bent from the protruding portion 551a so as to extend in a direction perpendicular to the first direction. The connecting portion 551b may be fixed to the fixture 310 of the second reflector 300.

The third segment 550 may include a plurality of heat sink protruding lines 553.

The plurality of heat sink protruding lines 553, as illustrated in FIGS. 3A and 3B, may be spaced apart from the third protrusion 551 and serve to dissipate heat generated from the light source module 100.

The second reflector 300 may include the fixture 310 to fix the third segment 550 of the cover plate 500.

The fixture 310 of the second reflector 300 may protrude from a lower surface of the second reflector 300 and include a protruding body 310a and a fixing body 310b.

The protruding body 310a of the fixture 310 protrudes in the first direction, and the fixing body 310b is bent from the protruding body 310a so as to extend in a direction perpendicular to the first direction. The fixing body 310b may fix the third protrusion 551 of the third segment 550 of the cover plate 500.

The fixing body 310b of the fixture 310 may further extend to cover the entire third protrusion 551 of the third segment 550.

Figure 6A:
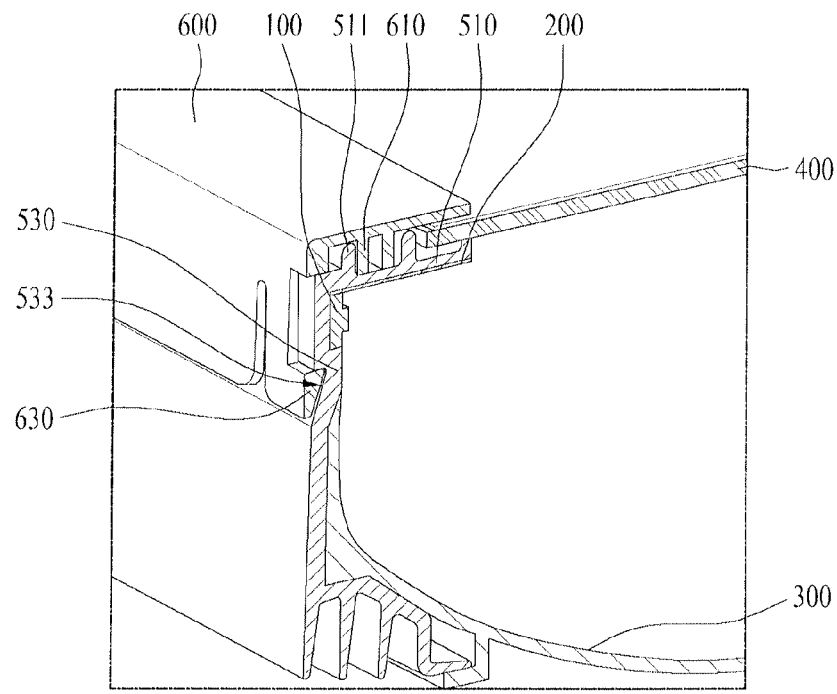
FIGS. 6A to 6C are views illustrating a coupled configuration of the cover plate and the panel support member.
Figure 6B:
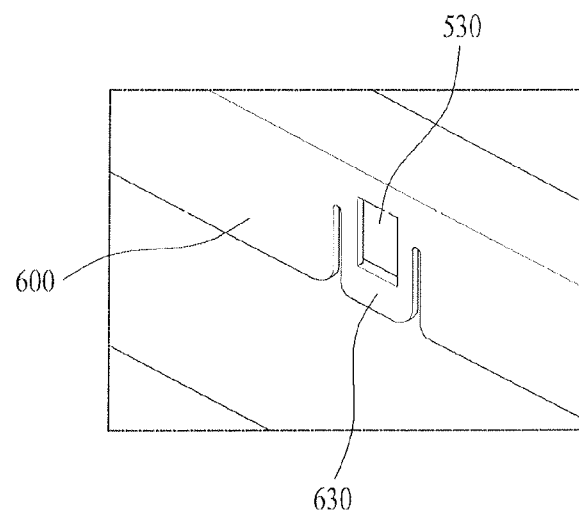
Figure 6C:
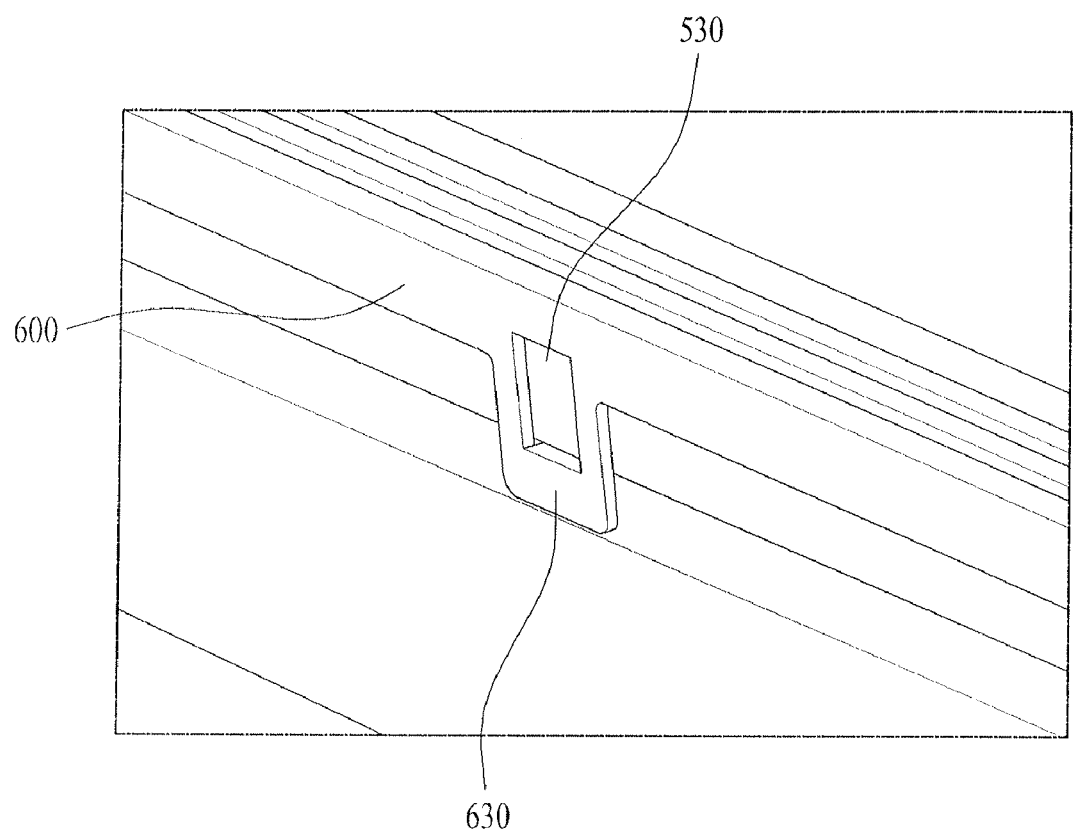

FIGS. 6A to 6C are views illustrating a coupled configuration of the cover plate and the panel support member.

FIG. 6A is a sectional view illustrating a coupled configuration of the cover plate and the panel support member, FIG. 6B illustrates a coupled configuration of the cover plate and the panel support member located at a region where the light source module is disposed, and FIG. 6C illustrates a coupled configuration of the cover plate and the panel support member located at a region where the light source module is not disposed.

As illustrated in FIGS. 6A to 6C, the panel support member 600 may be disposed to cover the first segment 510 and a part of the second segment 530 of the cover plate 500.

The panel support member 600 includes the fourth protrusion 610 and the fifth protrusion 630. The fourth protrusion 610 is inserted between the first protrusions 511 of the first segment 510, and the fifth protrusion 630 may be inserted into the coupling recess 533 of the second segment 530.

The cover plate 500 may be configured to support the light source module 100 while coming into contact with the first reflector 200 and the second reflector 300, thus serving as a heat sink to dissipate heat generated from the light source module 100.

The heat sink may include a plurality of heat sink protruding lines 553 and may be arranged on at least one of a region in contact with the first reflector 200, a region in contact with the second reflector 300 and a region in contact with the light source module.

Each of the heat sink protruding lines 553 may include first and second surfaces positioned opposite to each other and may have a trapezoidal shape such that the first and second surfaces parallel to each other have different areas.

The second surface of the heat sink protruding line 553 may be located closer to the light source module 100 than the first surface of the heat sink protruding line 553.

This configuration may increase a contact area between the heat sink protruding line 553 and the light source module 100, enabling heat generated from the light source module 100 to be dissipated as rapidly as possible.

Figure 7A:
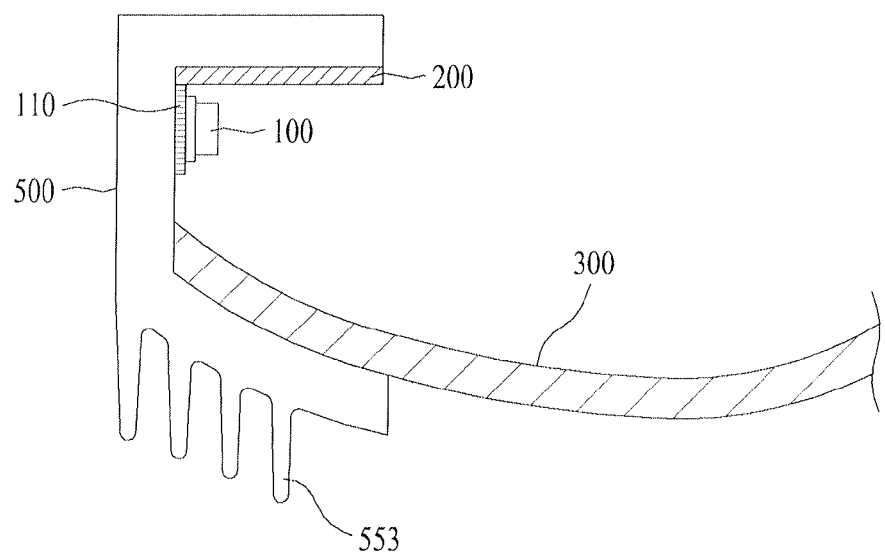
FIGS. 7A to 7C are views illustrating different positions of a heat sink.
Figure 7B:
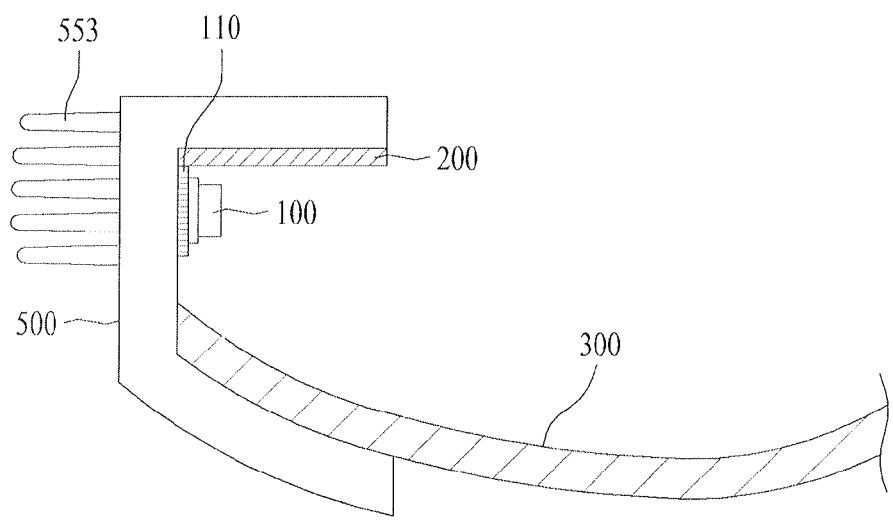
Figure 7C:
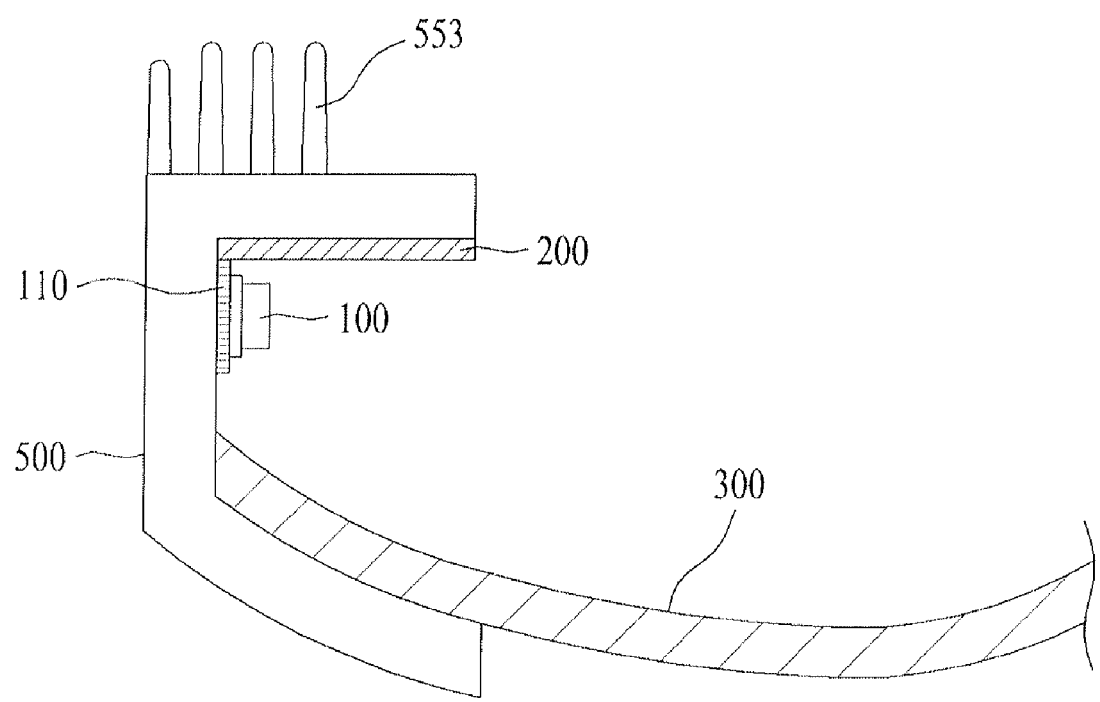

FIGS. 7A to 7C are views illustrating different positions of the heat sink.

As illustrated in FIG. 7A, the heat sink protruding lines 553 may be located at a partial region of the cover plate 550 coming into contact with the second reflector 300.

Alternatively, the heat sink protruding lines 553 may be located at a partial region of the cover plate 550 coming into contact with the light source module 100 as illustrated in FIG. 7B, or may be located at a partial region of the cover plate 550 coming into contact with the first reflector 200 as illustrated in FIG. 7C.

Figure 8:
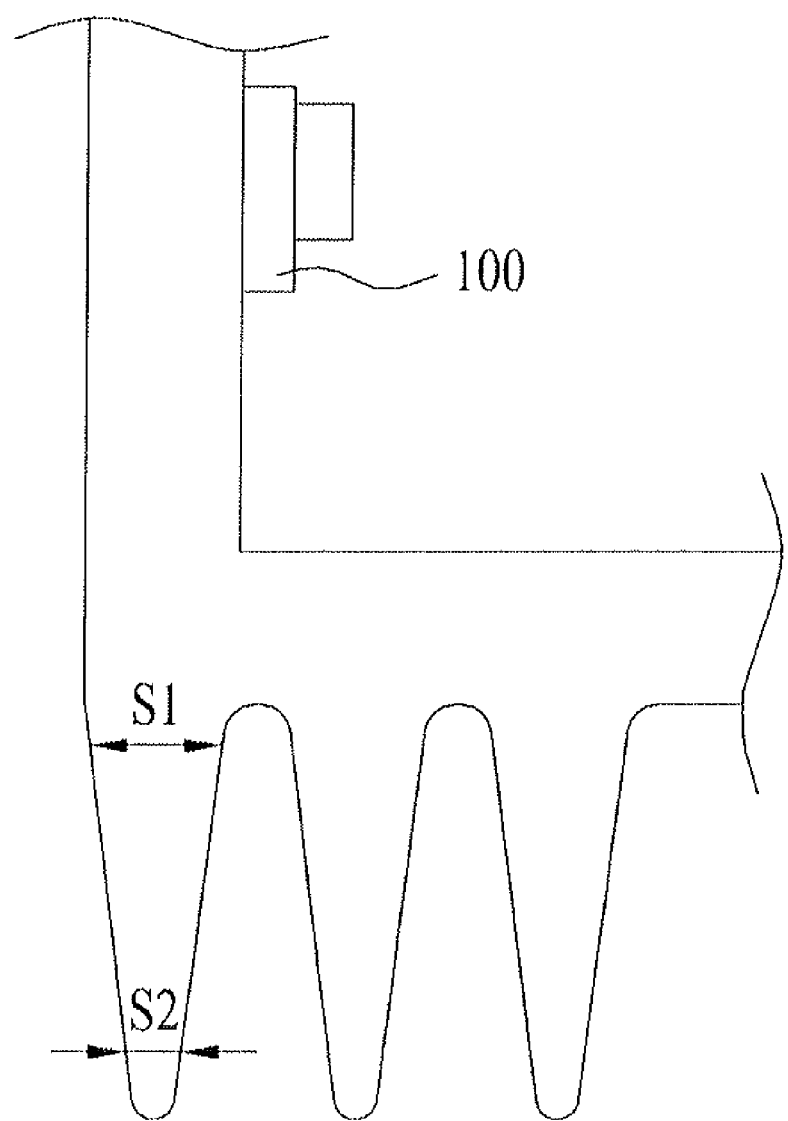
FIG. 8 is a sectional view illustrating heat sink protruding lines.

FIG. 8 is a sectional view of the heat sink protruding lines.

As illustrated in FIG. 8, each heat sink protruding line 553 may be configured such that an area S1 of the first surface thereof coming into contact with the cover plate 500 and an area S2 of the second surface opposite to the first surface may be equal to or different from each other, and the area S1 of the first surface of the heat sink protruding line 553 may be greater than the area S2 of the second surface opposite to the first surface.

This configuration serves to ensure heat generated from the light source module 100 to be dissipated as rapidly as possible.

As occasion demands, at least one of the plurality of heat sink protruding lines 553 may have a different thickness, height, etc.

Figure 9A:
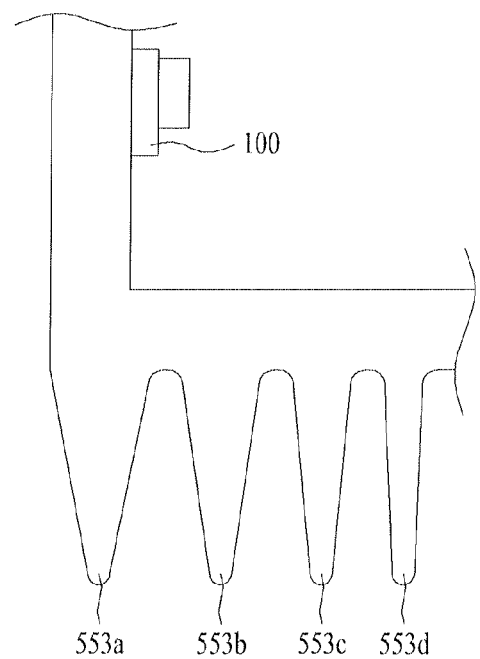
FIGS. 9A and 9B are views illustrating a shape of heat sink protruding lines.
Figure 9B:
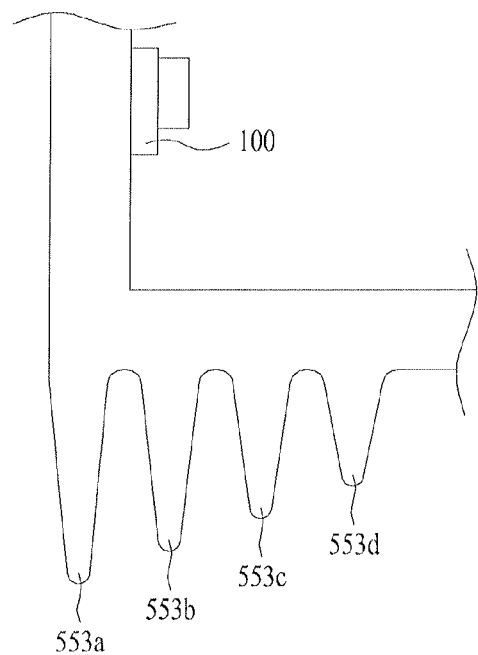

FIGS. 9A and 9B are views illustrating a shape of the heat sink protruding lines.

As illustrated in FIG. 9A, among a plurality of heat sink protruding lines 553*a*, 553*b*, 553*c* and 553*d*, the heat sink protruding line 553*a* located closest to the light source module 100 may have a greater thickness than the other heat sink protruding lines located distant from the light source module 100.

As illustrated in FIG. 9B, among a plurality of heat sink protruding lines 553*a*, 553*b*, 553*c* and 553*d*, the heat sink protruding line 553*a* located closest to the light source module 100 may have a greater height than the other heat sink protruding lines located distant from the light source module 100.

The reason for arranging the heat sink protruding lines 553 as described above is because temperature increases with decreasing distance from the light source module 100 and thus, increasing a surface area of the heat sink protruding line 553 located at a high temperature region ensures efficient heat sink.

To enhance dissipation effects of heat generated from the light source module 100, the thickness of a partial region of the cover plate 550 coming into contact with the light source module 100 may be greater than the thickness of a partial region of the cover plate 550 coming into contact with the second reflector 300.

Additionally, the thermal pad may be disposed between the cover plate 500 and the light source module 100.

The cover plate 500 coming into contact with the second reflector 300 may have the same curved surface as that of the lower surface of the second reflector 300.

Figure 10:
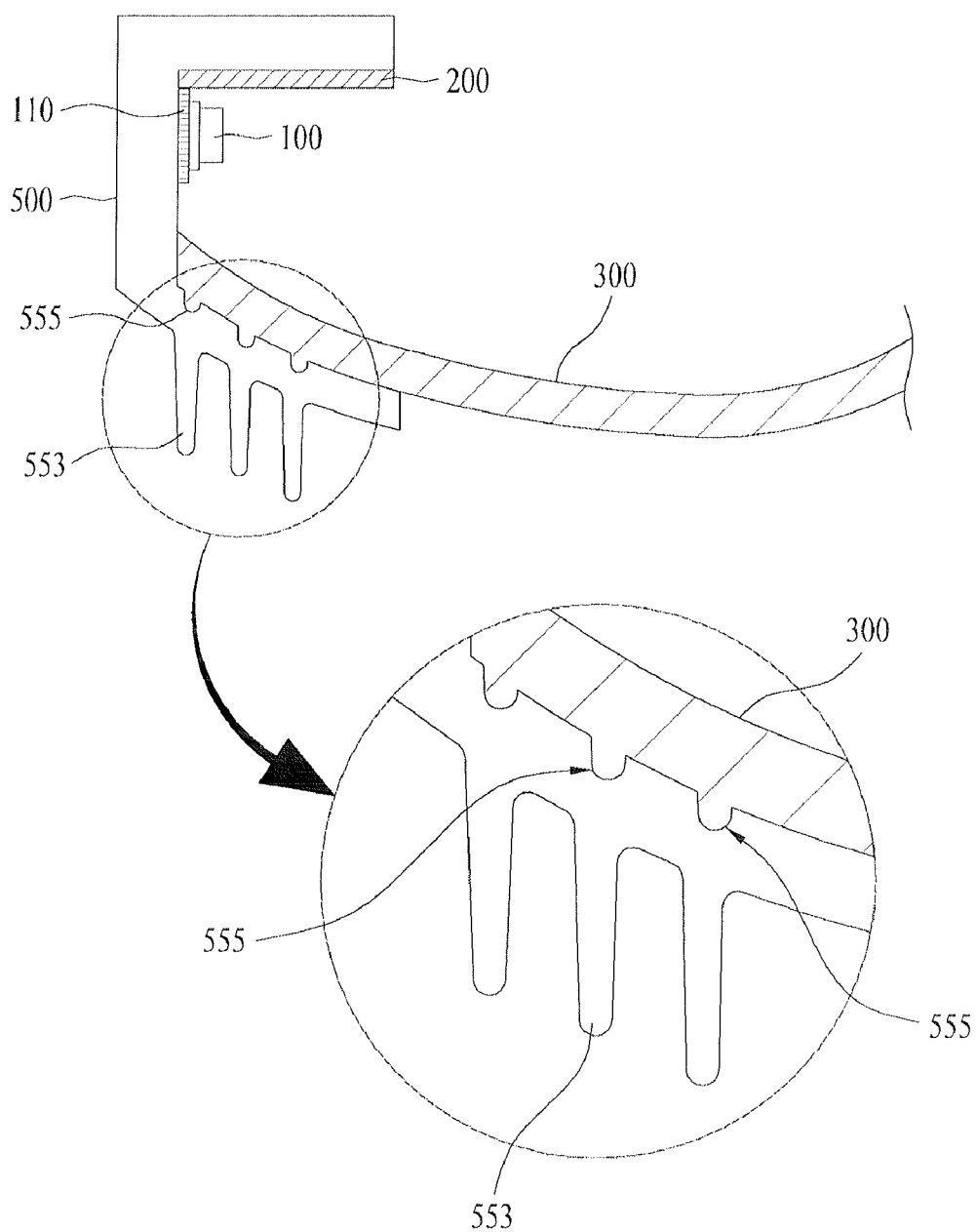
FIG. 10 is a view illustrating recesses formed in a heat sink protruding line region.

The cover plate 500, as illustrated in FIG. 10, has a plurality of recesses 555 formed in a region thereof coming into contact with the second reflector 300. The respective recesses 555 may correspond to the respective heat sink protruding lines 553.

The respective recesses 555 may be configured to receive bosses of the second reflector 300.

Specifically, the second reflector 300 may be provided at the lower surface thereof with the plurality of bosses. The respective bosses are inserted into the recesses 555 of the cover plate 500, and the heat sink protruding lines 553 may be positioned to correspond to the respective recesses 555.

The reason for forming the recesses 555 to correspond to the heat sink protruding lines 553 is to increase coupling force with the second reflector 300 and increase a heat sink area of the heat sink protruding lines 553.

In the present embodiment, a plurality of heat sinks may be provided at a plurality of regions. In the case of a 2-edge type backlight unit including a plurality of light source modules, the heat sinks may be located at symmetrical positions. Of course, the positions of the heat sinks may be changed according to design conditions.

Figure 11:
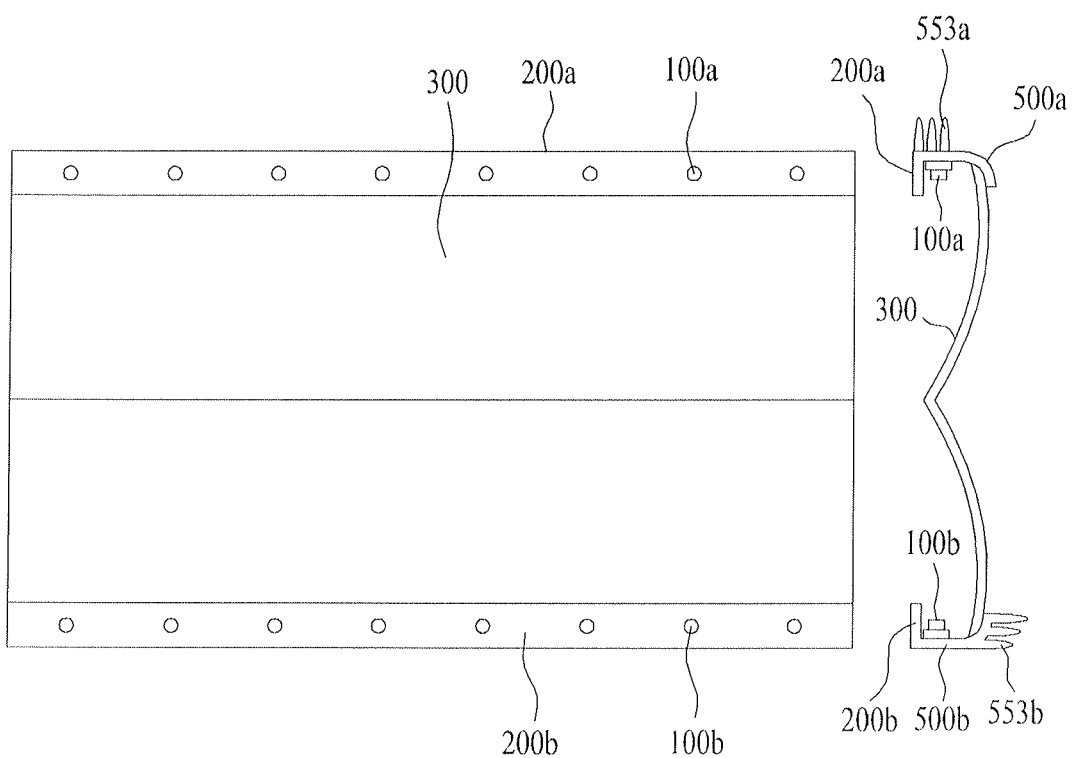
FIG. 11 is a view illustrating a position of the heat sink provided in the 2-edge type backlight unit.
Figure 12A:
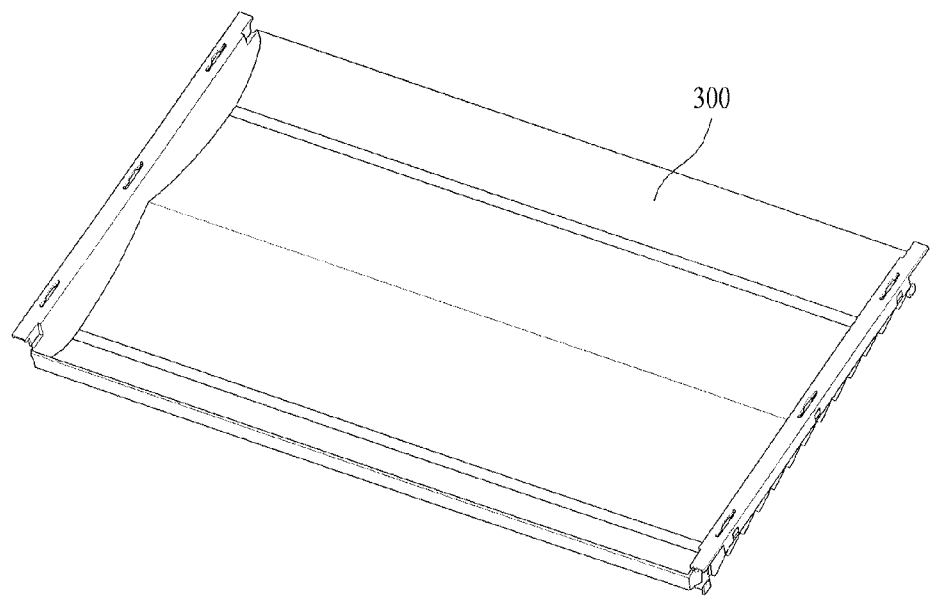
FIGS. 12A to 12D are views illustrating a bottom cover including the second reflector.
Figure 12B:
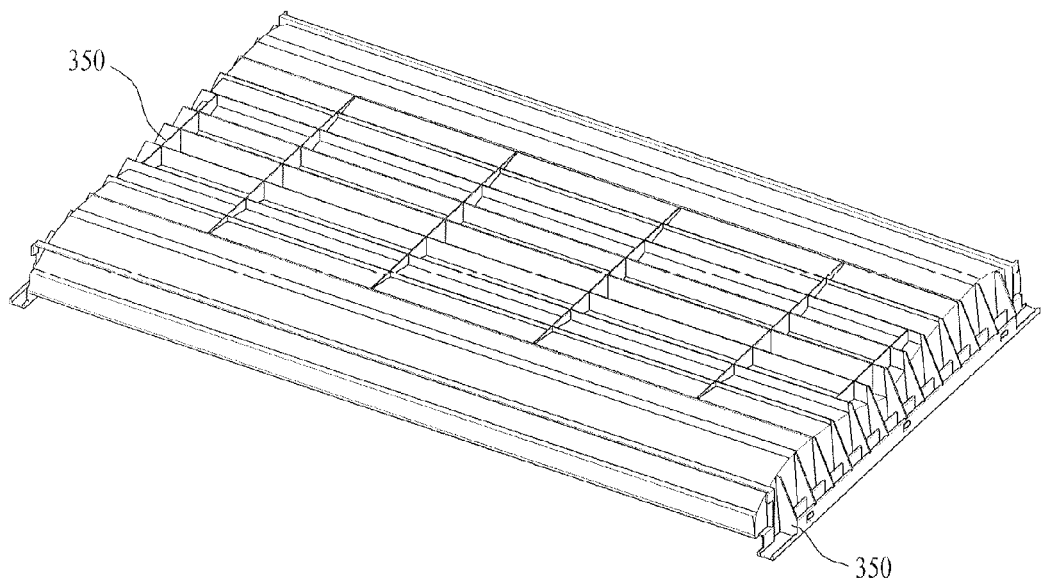
Figure 12C:
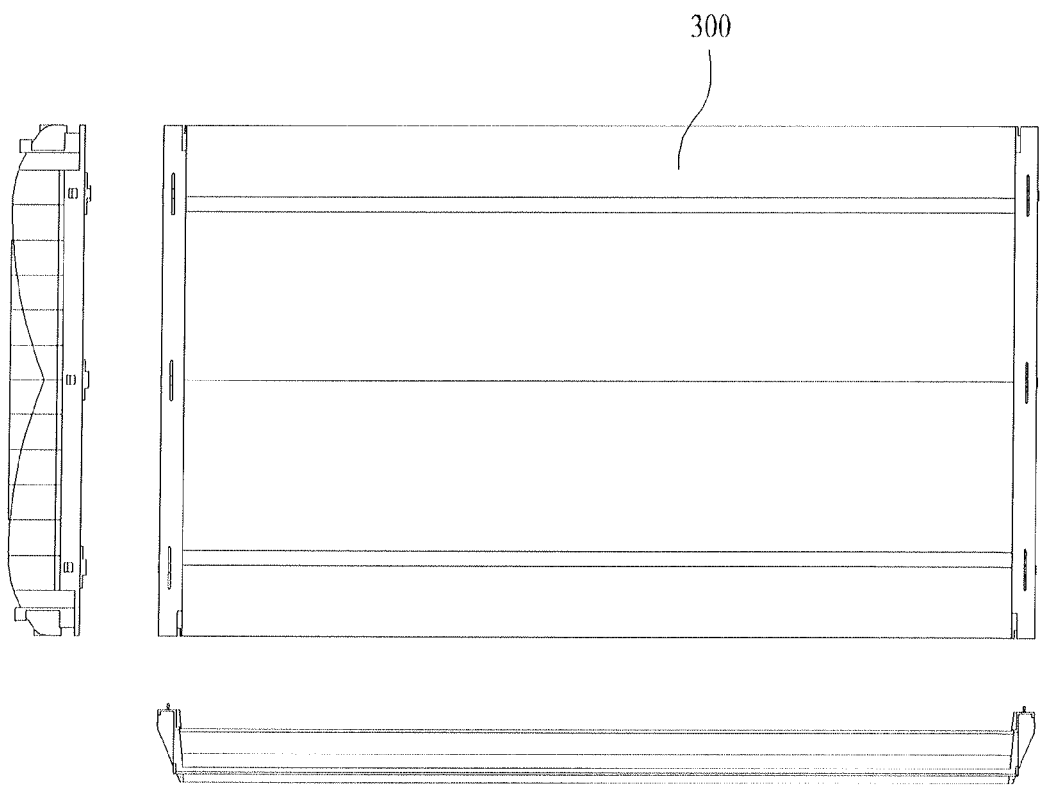
Figure 12D:
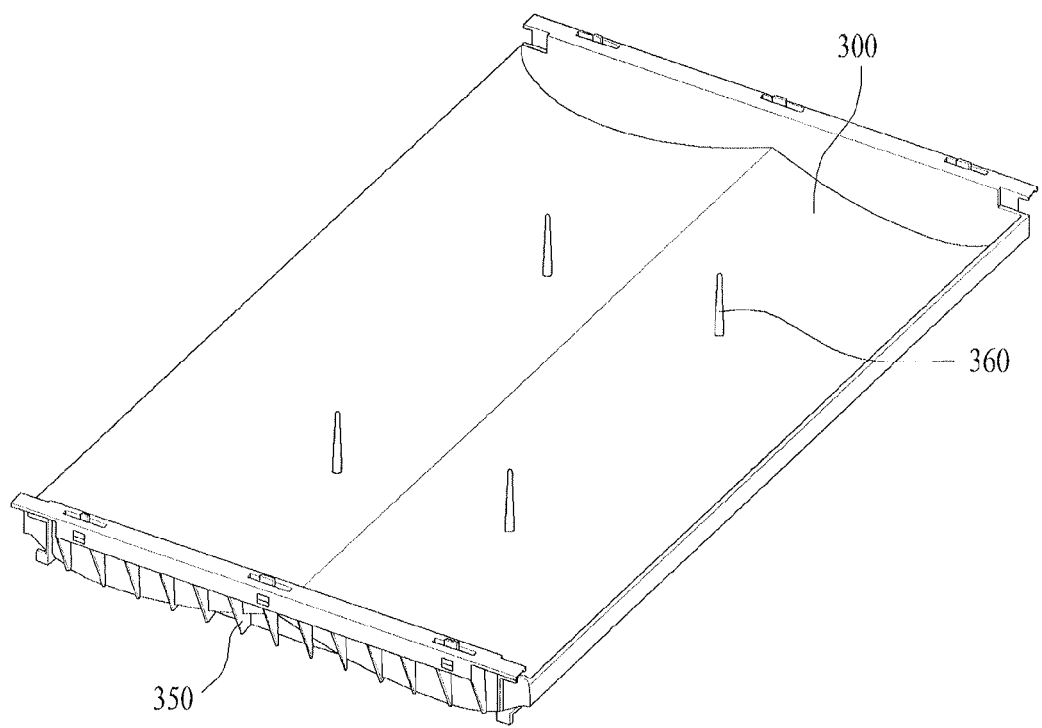

FIG. 11 is a view illustrating a position of the heat sink provided in the 2-edge type backlight unit.

As illustrated in FIG. 11, two first reflectors 200*a* and 200*b* are spaced apart from each other in a first direction to face each other, and the second reflector 300 may be spaced apart from the two first reflectors 200*a* and 200*b* in a second direction perpendicular to the first direction.

A first light source module 100*a* may be disposed between the first reflector 200*a* and the second reflector 300 and a second light source module 100*b* may be disposed between the first reflector 200*b* and the second reflector 300.

A first cover plate 500*a*, which serves as a first heat sink, may support the first light source module 100*a* and may come into contact with the first reflector 200*a* and the second reflector 300.

A plurality of first heat sink protruding lines 553*a* may be provided on at least one of a region of the first cover plate 500*a* in contact with the first reflector 200*a*, a region of the first cover plate 500*a* in contact with the second reflector 300 and a region of the first cover plate 500*a* in contact with the first light source module 100*a*, thereby acting to dissipate heat generated from the first light source module 100*a*.

A second cover plate 500*b*, which serves as a second heat sink, may support the second light source module 100*b* and may come into contact with the first reflector 200*b* and the second reflector 300.

A plurality of second heat sink protruding lines 553*b* may be provided on at least one of a region of the second cover plate 500*b* in contact with the first reflector 200*b*, a region of the second cover plate 500*b* in contact with the second reflector 300 and a region of the second cover plate 500*b* in contact with the second light source module 100*b*, thereby acting to dissipate heat generated from the second light source module 100*b*.

The first and second heat sink protruding lines 553*a* and 553*b*, as illustrated in FIG. 11, may be arranged at different positions so as not to be symmetric to each other.

However, in consideration of cost, the first and second heat sink protruding lines 553*a* and 553*b* may be arranged at the same positions so as to be symmetric to each other.

As described above, the backlight unit of the present embodiment has a configuration in which a bottom cover including the second reflector, the cover plate including the heat sink protruding lines and the first reflector and a panel guide including the panel support member are coupled to one another.

Figure 13A:
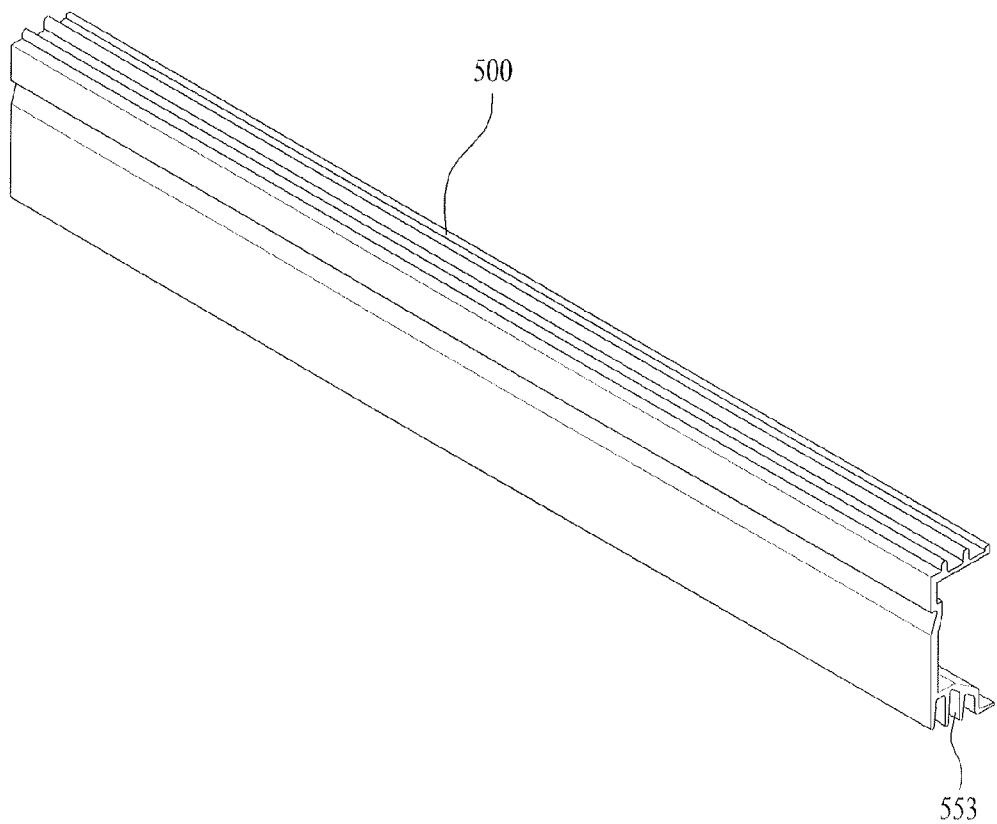
FIGS. 13A to 13C are views illustrating a cover plate including a first reflector and heat sink protruding lines.
Figure 13B:
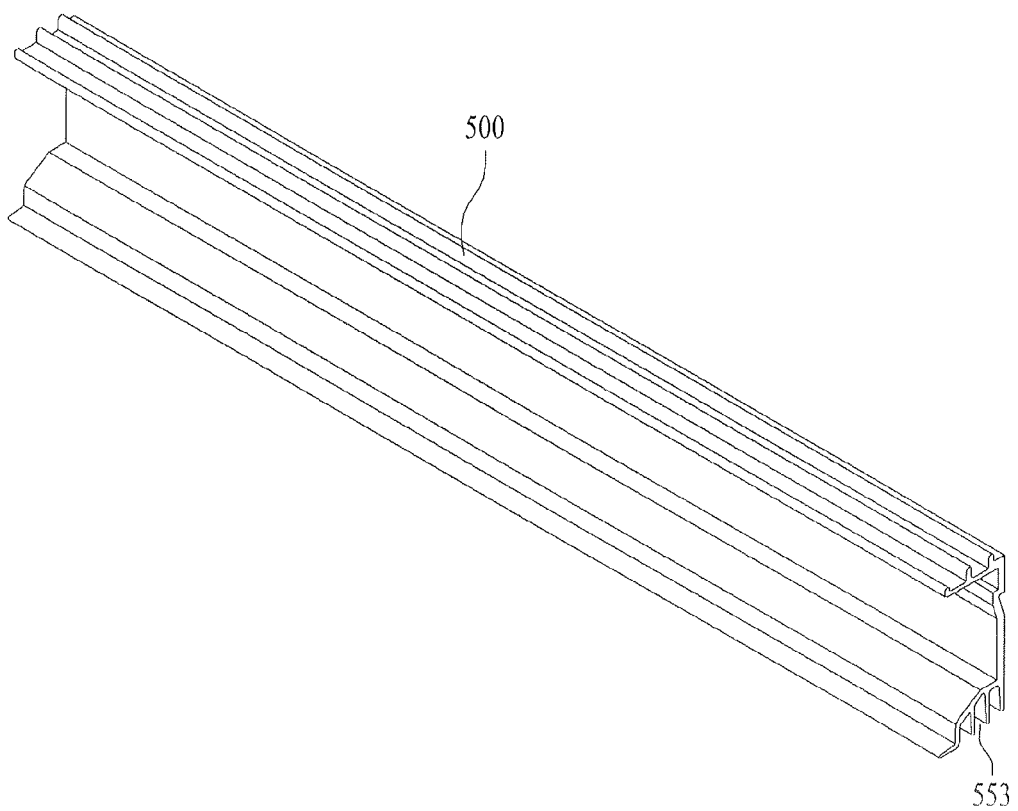
Figure 13C:
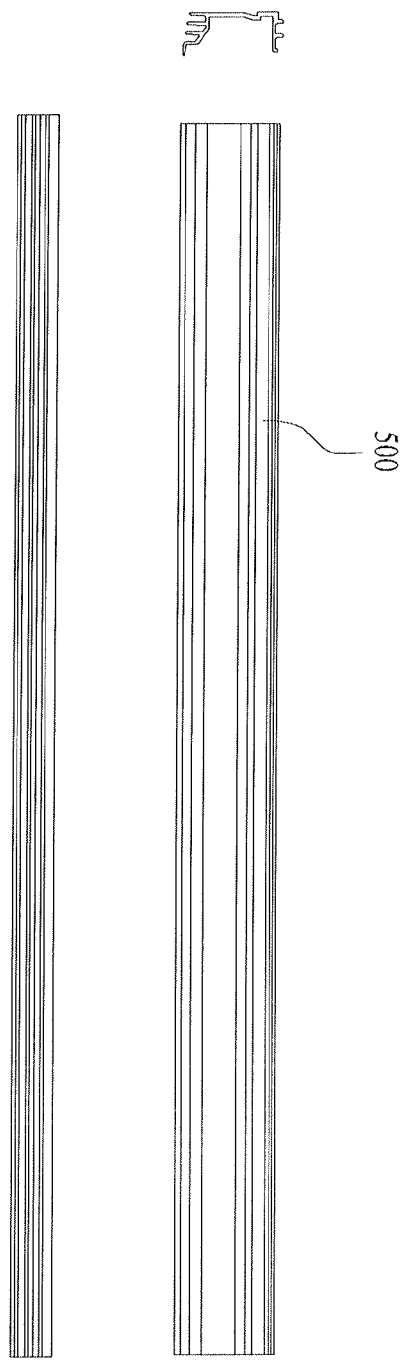
Figure 14A:
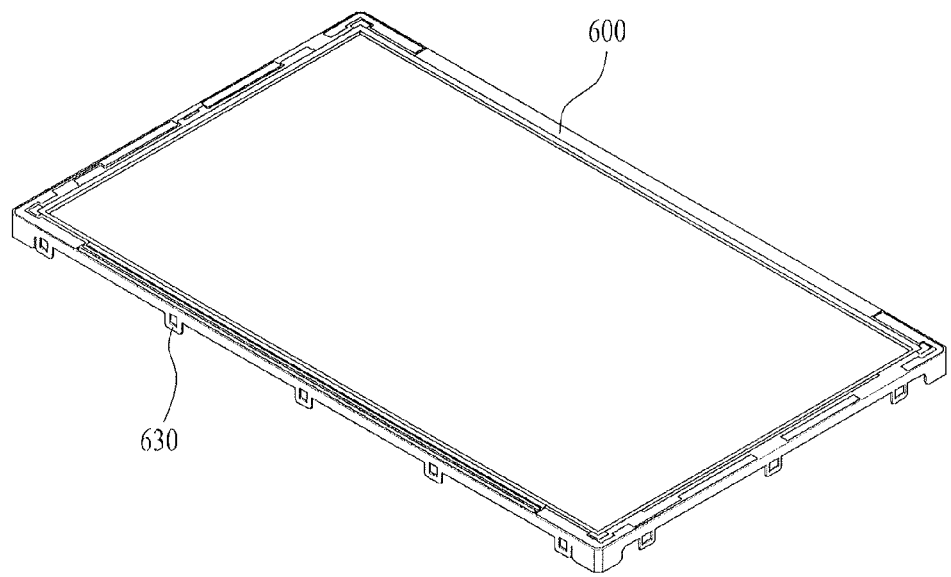
FIGS. 14A to 14C are views illustrating a panel guide including the panel support member.
Figure 14B:
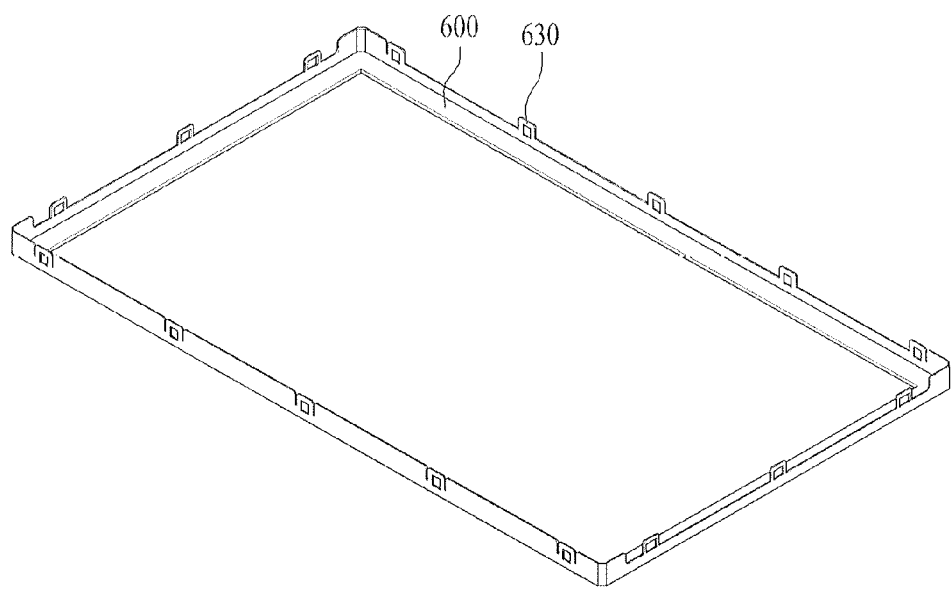
Figure 14C:
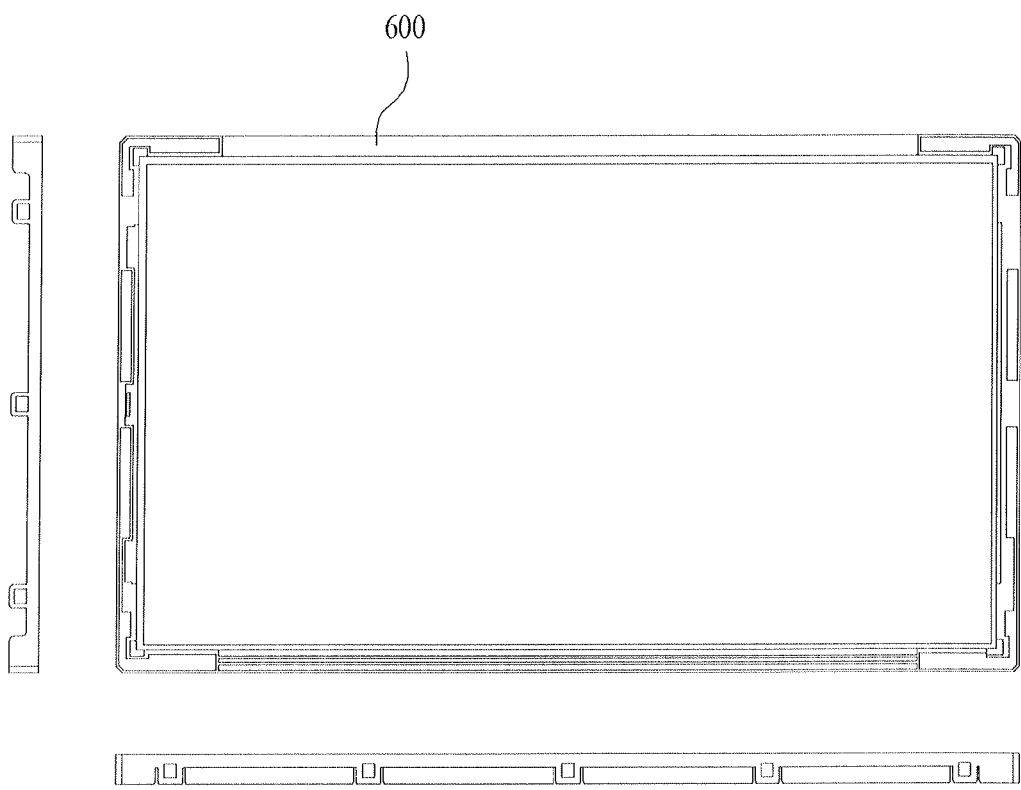
Figure 15A:
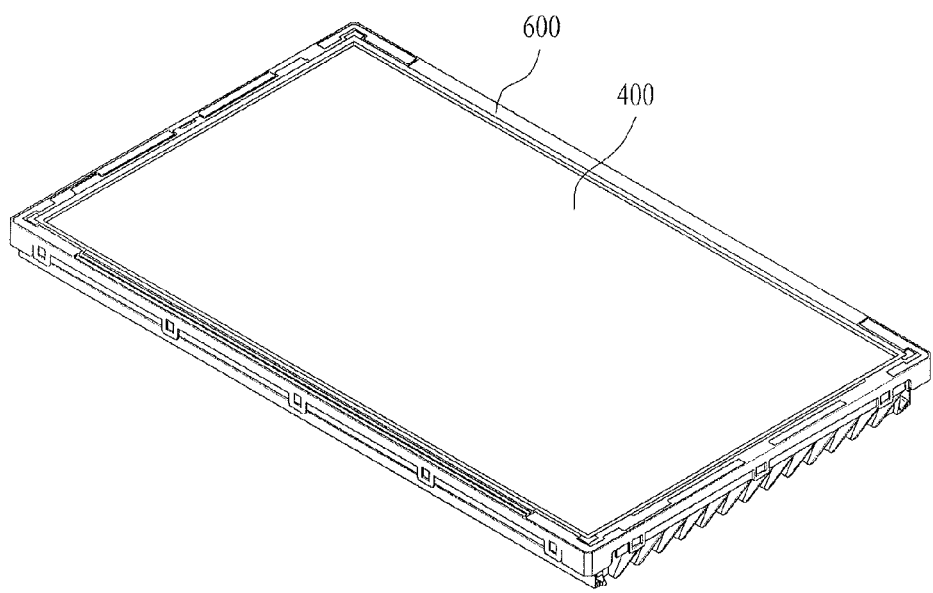
FIGS. 15A to 15C are views illustrating the backlight unit in which the bottom cover, the cover plate and the panel guide are coupled to one another.
Figure 15B:
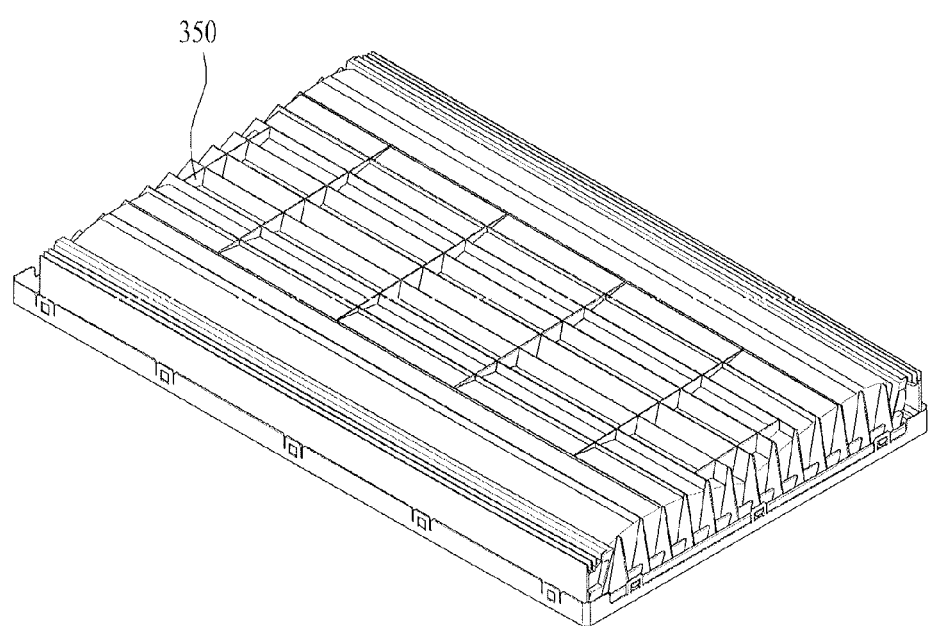
Figure 15C:
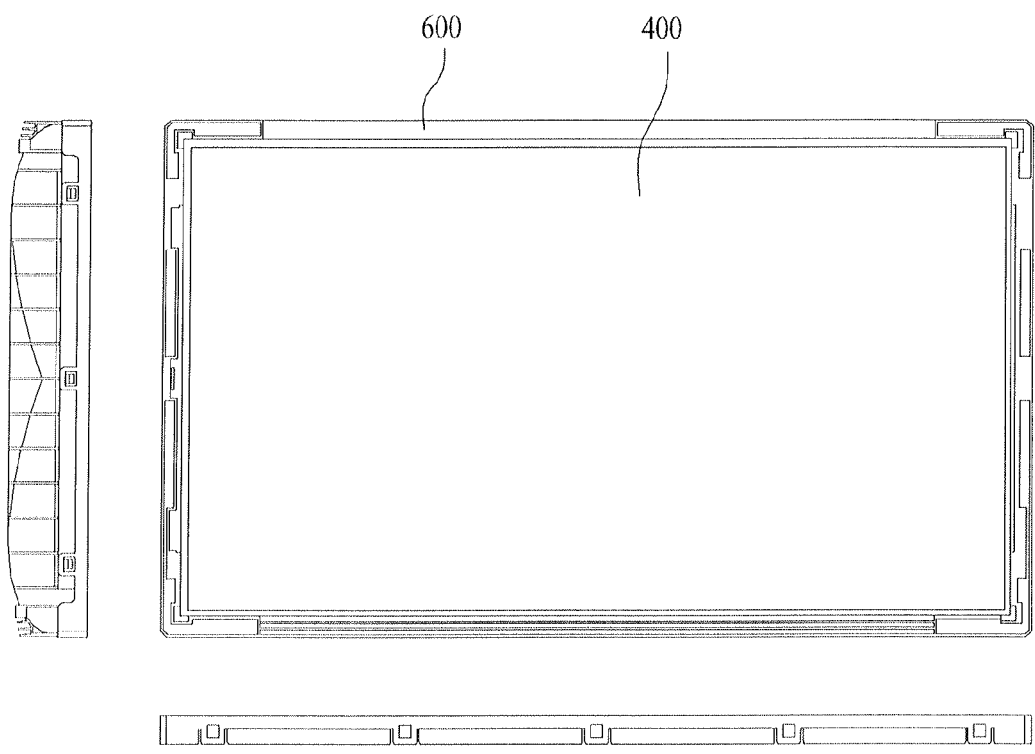

FIGS. 12A to 12D are views illustrating the bottom cover including the second reflector, FIGS. 13A to 13C are views illustrating the cover plate including the first reflector and the heat sink protruding lines, FIGS. 14A to 14C are views illustrating the panel guide including the panel support member, and FIGS. 15A to 15C are views illustrating the backlight unit in which the bottom cover, the cover plate and the panel guide are coupled to one another.

As illustrated in FIGS. 12A to 12D, the bottom cover including the second reflector 300 may be made of a polymer resin, such as injection molded plastic, etc.

The bottom cover may include at least two inclined surfaces having at least one inflection point, and the first and second inclined surfaces adjacent to each other about the inflection point may have different curvatures.

The bottom cover may include a plurality of reinforcement ribs 350 at the lower surface of the second reflector 300.

Since the second reflector 300 may be easily deformed upon receiving external shock due to a curved reflective surface thereof, the reinforcement ribs 350 may be installed to prevent deformation of the second reflector 300.

The reinforcement ribs 350 may be arranged at a rear surface of the bottom cover facing the inclined surfaces of the second reflector 300 and also, at a rear surface of the bottom cover facing lateral surfaces of the second reflector 300.

The bottom cover may also include a plurality of support pins 360 at the upper surface of the second reflector 300 to support the optical member.

This is because the optical member is spaced apart from the second reflector 300 to define an air guide therebetween and thus, a central region of the optical member may sag.

The support pins 360 may be stably configured such that the area of a lower surface thereof coming into contact with the second reflector 300 is greater than the area of an upper surface thereof.

As illustrated in FIGS. 13A to 13C, the cover plate 500 may include the first segment in contact with the first reflector, the second segment in contact with the light source module and the third segment in contact with the second reflector.

The third segment may be provided with the heat sink protruding lines 553 to dissipate heat of the light source module.

The cover plate 500 may support the optical member using the protrusion formed at the first segment, may be coupled to the panel guide, i.e. the panel support member using the protrusion and the coupling recess of the second segment, and may be coupled to the fixture of the second reflector using the protrusion of the third segment.

Here, the cover plate 500 and the bottom cover including the second reflector may be made of different materials.

For example, the cover plate 500 may be made of a metal and the bottom cover including the second reflector may be made of a polymer resin.

As illustrated in FIGS. 14A to 14C, the panel guide including the panel support member 600 may include the protrusion coupled to the first segment of the cover plate and the protrusion coupled to the second segment of the cover plate.

Here, each hook-shaped fifth protrusion 630 may be located at a position of the panel guide corresponding to the coupling recess of the second segment.

As illustrated in FIGS. 15A to 15C, the mold bottom cover including the second reflector, the cover plate including the heat sink protruding lines and the first reflector and the panel guide including the panel support member are all fabricated and are coupled to one another and then, the optical member 400 is coupled to the cover plate, completing the backlight unit.

Then, when a display panel is coupled to the panel guide of the backlight unit, a display apparatus may be completed.

Figure 16:
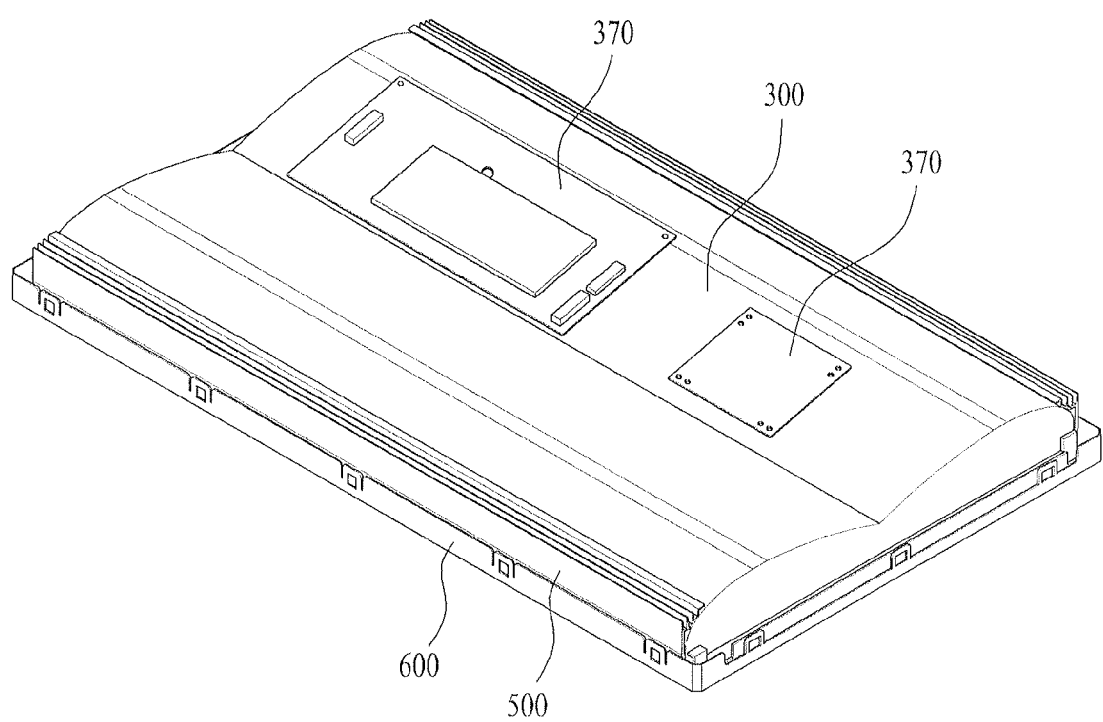
FIG. 16 is a view illustrating a circuit device disposed under the bottom cover.

FIG. 16 is a view illustrating a circuit device disposed under the mold bottom cover.

As illustrated in FIG. 16, circuit devices 370 to drive the light source module may be arranged under the inclined surfaces of the second reflector 300.

A space is defined under the second reflector 300 between the inclined surfaces of the second reflector 300. Thus, arranging the circuit devices in the corresponding space enables efficient space utilization.

The above described configuration of the backlight unit is given by way of example, and it will be appreciated that various modified configurations of the backlight unit are possible.

The first and second reflectors 200 and 300 may partially have a planar or inclined surface and the inclined surface may be a flat or curved surface.

Also, the curved inclined surface may be a concavely or convexly inclined surface.

Thus, the second reflector 300 need not be parallel to the first reflector 200 and may have at least one of a planar surface, flat inclined surface, concavely inclined surface and convexly inclined surface.

The second reflector 300 may be configured by attaching a reflective film to a mold body having an inclined surface or by attaching a reflective film having an inclined surface to a mold body having a planar surface, or may be a mold body having an inclined reflective surface.

The reflective film may contain at least one of a metal or a metal oxide. For example, the reflective layer may contain a metal or metal oxide having high reflectivity, such as Al, Ag, Au or $TiO_2$.

The first reflector 200 and the second reflector 300 may have different reflective patterns.

Specifically, the first reflector 200 may have a specular surface to reflect light, and the second reflector 300 may have a diffusive reflective surface to diffuse and reflect light.

Alternatively, the first reflector 200 may have a diffusive reflective surface to diffuse and reflect light and the second reflector 300 may have a specular surface to reflect light.

As occasion demands, the second reflector 300 may have a specular reflective surface close to the light source module 100 and a diffusion reflective surface distant from the light source module 100.

In the present embodiment, a light emission surface of the light source module 100 may be oriented in various directions.

Specifically, the light source module 100 may be of a direct emitting type in which the light emission surface is oriented toward the air guide between the optical member 400 and the second reflector 300, or may be of an indirect emitting type in which the light emission surface is oriented toward any one of the first reflector 200, the second reflector 300 and the cover plate 500.

Light emitted from the indirect emitting type light source module 100 may be reflected from the first reflector 200, the second reflector 300 and the cover plate 500 and the reflected light may be directed toward the air guide of the backlight unit.

The indirect emitting type light source module 100 serves to reduce hot spot phenomenon.

Figure 17:
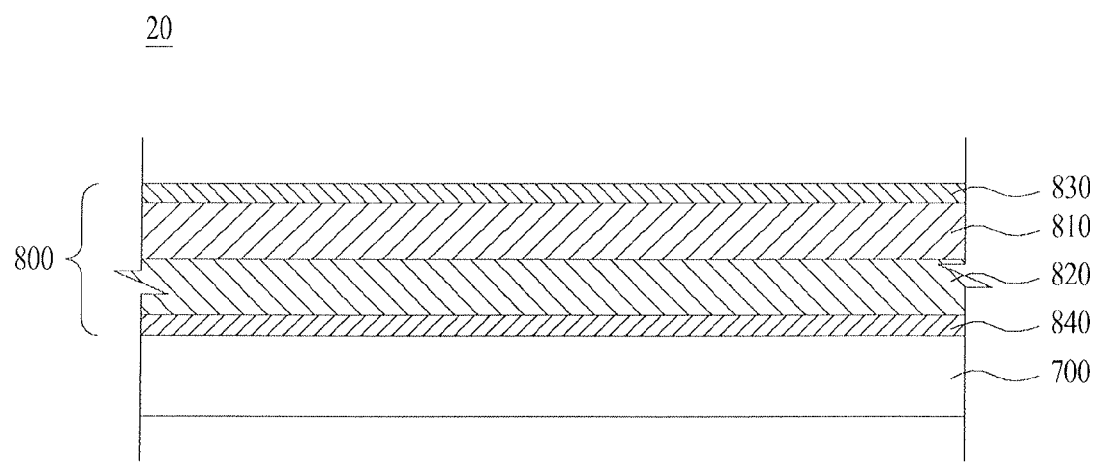
FIG. 17 is a view illustrating a display module including a backlight unit according to an embodiment.

FIG. 17 is a view illustrating a display module including a backlight unit according to an embodiment.

As illustrated in FIG. 17, the display module 20 may include a display panel 800 and a backlight unit 700.

The display panel 800 may include a color filter substrate 810 and a Thin Film Transistor (TFT) substrate 820, which are bonded to face each other with a uniform cell gap therebetween. A liquid crystal layer (not shown) may be interposed between the two substrate 810 and 820.

An upper polarizing plate 830 and a lower polarizing plate 840 may be disposed respectively on and under the display panel 800. More particularly, the upper polarizing plate 830 may be disposed at an upper surface of the color filter substrate 810 and the lower polarizing plate 840 may be disposed at a lower surface of the TFT substrate 820.

Although not illustrated, gate and data drivers may be provided at a lateral surface of the display panel 800, to generate drive signals required to drive the panel 800.

Figure 18:
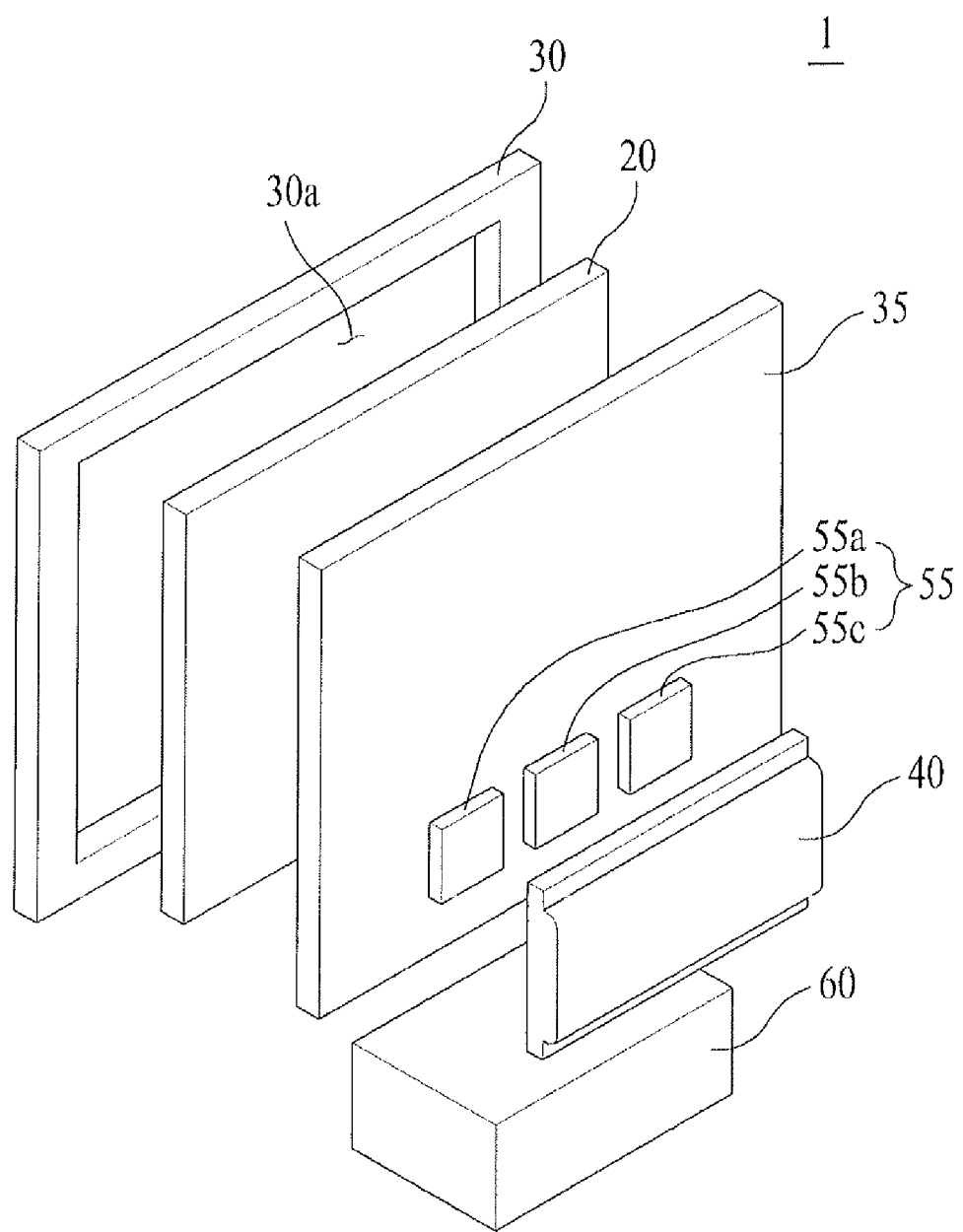
FIGS. 18 and 19 are views illustrating a display apparatus according to an embodiment.
Figure 19:
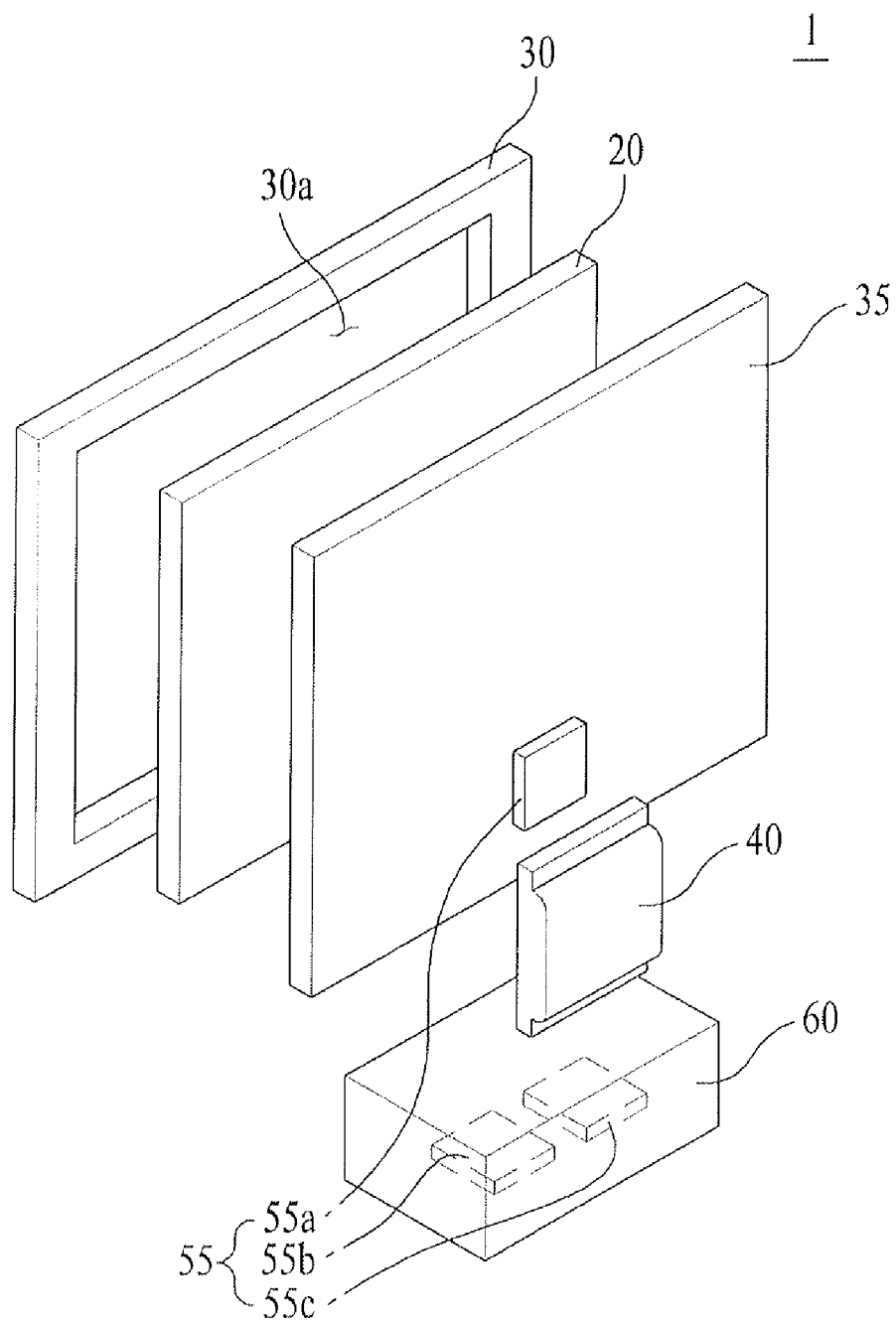

FIGS. 18 and 19 are views illustrating a display apparatus according to an embodiment.

Referring to FIG. 18, the display apparatus 1 may include the display module 20, a front cover 80 and a back cover 35 to cover the display module 20, a drive unit 55 provided at the back cover 35, and a drive unit cover 40 to enclose the drive unit 55.

The front cover 30 may include a transparent front panel (not shown) to ensure transmission of light. The front panel serves to protect the display module 20 spaced apart therefrom by a predetermined distance and transmit light emitted from the display module 20, allowing an image displayed on the display module 20 to be seen from the outside.

The back cover 35 may be coupled to the front cover 30 so as to project the display module 20.

The drive unit 55 may be disposed on a surface of the back cover 35.

The drive unit 55 may include a drive controller 55a, a main board 55b and a power supply 55c.

The drive controller 55a may be a timing controller. The drive controller 55a serves to adjust an operation timing of each driver IC of the display module 20. The main board 55b may serve to transmit V-sync, H-sync and R, G and B resolution signals to the timing controller. The power supply 55c supplies power to the display module 20.

The drive unit 55 may be disposed on the back cover 35 and enclosed by the drive unit cover 40.

The back cover 35 has a plurality of holes, through which the display module 20 may be connected to the drive unit 55. Also, a stand 60 to support the display apparatus 1 may be provided.

In an alternative embodiment, as illustrated in FIG. 19, the drive controller 55a of the drive unit 55 may be provided at the cover 35, whereas the main board 55b and the power supply 55c may be provided in the stand 60.

The drive unit cover 40 may be configured to enclose only the drive unit 55 provided at the back cover 35.

Although the embodiment illustrates the main board 55b and the power supply 55c as being provided separately, they may be integrated, without being limited thereto.

As is apparent from the above description, according to the embodiments of the present invention, as a result of providing a reflector with inclined surfaces having different curvatures, the reflector suitable for an air guide can be fabricated to have a simplified configuration, which ensures light-weight design suited to mass-production and uniform luminance of a backlight unit including the reflector.

Thus, the backlight unit can achieve enhanced economic efficiency and reliability.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
   a first reflector;
   a second reflector; and
   at least one light source disposed between the first reflector and the second reflector, wherein the light source includes a light emitting diode (LED),
   wherein the second reflector includes at least two inclined surfaces having at least one inflection point, and radii of curvature of the first and second inclined surfaces adjacent to each other about the inflection point are different from each other, and
   wherein a distance between a first vertical line extending from the inflection point and a second vertical line extending from a distal end point of the first inclined surface is less than or equal to a distance between the first vertical line extending from the inflection point and a third vertical line extending from a distal end point of the second inclined surface.

2. The backlight unit according to claim 1, wherein the first inclined surface is adjacent to the light source and the radius of curvature of the first inclined surface is less than the radius of curvature of the second inclined surface.

3. The backlight unit according to claim 2, wherein a ratio of the radius of curvature of the first inclined surface to the radius of curvature of the second inclined surface is in a range of 1:1.1 to 1:10.

4. The backlight unit according to claim 1, wherein a first distance between a first horizontal line extending from the inflection point and a second horizontal line extending from a distal end point of the first inclined surface is less than a second distance between the first horizontal line extending from the inflection point and a third horizontal line extending from a distal end point of the second inclined surface.

5. The backlight unit according to claim 4, wherein a ratio of the first distance to the second distance is in a range of 1:1.1 to 1:5.

6. The backlight unit according to claim 1, wherein a first distance between a first horizontal line extending from the inflection point and a second horizontal line extending from a distal end point of the first inclined surface is equal to or greater than a second distance between the first horizontal line extending from the inflection point and a third horizontal line extending from a distal end point of the second inclined surface.

7. The backlight unit according to claim 6, wherein a ratio of the first distance to the second distance is in a range of 1:0.01 to 1:1.

8. The backlight unit according to claim 1, wherein a ratio of the distance between the first vertical line and the second vertical line to the distance between the first vertical line and the third vertical line is in a range of 1:1 to 1:20.

9. The backlight unit according to claim 1, further comprising a heat sink to support the light source and come into contact with at least one of the light source, the first reflector and the second reflector so as to dissipate heat generated from the light source, wherein the heat sink includes a plurality of heat sink protruding lines arranged on at least one of a region thereof coming into contact with the first reflector, a region thereof coming into contact with the second reflector and a region thereof coming into contact with the light source.

10. The backlight unit according to claim 9, wherein the heat sink includes:
   a first region coming into contact with the first reflector;
   a second region extending from the first region and coming into contact with the light source;
   a third region extending from the second region and coming into contact with the second reflector; and
   the plurality of heat sink protruding lines protruding from at least one of the first region, the second region and the third region.

11. The backlight unit according to claim 1, further comprising a cover plate to support the light source and come into contact with the first reflector and the second reflector, wherein the cover plate includes:
   a first segment having a first surface to which the first reflector is attached and a second surface opposite to the first surface, the second surface being provided with a plurality of first protrusions;
   a second segment extending from the first segment and having a second protrusion adjacent to the light source and a coupling recess formed at an opposite side of the second protrusion; and
   a third segment extending from the second segment and fixed to one side of the second reflector, the third segment having a third protrusion.

12. The backlight unit according to claim 11, further comprising:
   an optical member supported on any one of the first protrusions of the first segment and disposed to face the second reflector; and
   a panel support member configured to cover a part of the cover plate and fixed to the cover plate.

13. The backlight unit according to claim 12, wherein the panel support member includes:
   a fourth protrusion inserted into the first protrusions of the first segment; and
   a fifth protrusion inserted into the coupling recess of the second segment.

14. The backlight unit according to claim 11, wherein the second protrusion of the second segment is disposed at the periphery of the light source to support the light source.

15. The backlight unit according to claim 11, wherein the third protrusion of the third segment includes:
   a protruding portion extending in a first direction; and
   a connecting portion bent from the protruding portion so as to extend in a direction perpendicular to the first direction, the connecting portion being fixed to the second reflector.

16. The backlight unit according to claim 11, wherein the second reflector includes a fixture protruding from a lower surface thereof to fix the cover plate.

17. The backlight unit according to claim 1, wherein the second reflector and the cover plate are made of different materials.

18. A backlight unit comprising:
   a first reflector;
   a second reflector;
   at least one light source disposed between the first reflector and the second reflector; and
   a cover plate to support the light source and come into contact with the first reflector and the second reflector, wherein the light source includes a light emitting diode (LED), and wherein the cover plate includes:
   a first segment having a first surface to which the first reflector is attached and a second surface opposite to the first surface, the second surface being provided with a plurality of first protrusions;
   a second segment extending from the first segment and having a second protrusion adjacent to the light source and a coupling recess formed at an opposite side of the second protrusion; and
   a third segment extending from the second segment and fixed to one side of the second reflector, the third segment having a third protrusion.

19. A display apparatus comprising:
   a display panel: and
   a backlight unit to project light to the display panel, wherein the backlight unit includes:
   a first reflector;
   a second reflector; and
   at least one light source disposed between the first reflector and the second reflector, wherein the light source includes a light emitting diode (LED), and wherein the second reflector includes at least two inclined surfaces having at least one inflection point, and radii of curvature of the first and second inclined surfaces adjacent to each other about the inflection point are different from each other.

* * * * *